US012563499B2

(12) United States Patent　　(10) Patent No.:　US 12,563,499 B2
Bhattad et al.　　　　　　　　　(45) Date of Patent:　Feb. 24, 2026

(54) POWER OPTIMIZATIONS FOR TRANSMISSION OPPORTUNITY (TXOP) MONITORING

(71) Applicant: QUALCOMM Incorporated, San Diego, CA (US)

(72) Inventors: Kapil Bhattad, Bangalore (IN); Jing Sun, San Diego, CA (US); Xiaoxia Zhang, San Diego, CA (US); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/965,600

(22) Filed: Oct. 13, 2022

(65) Prior Publication Data

US 2023/0032957 A1　　Feb. 2, 2023

Related U.S. Application Data

(63) Continuation of application No. 16/363,654, filed on Mar. 25, 2019.

(30) Foreign Application Priority Data

Mar. 26, 2018　(IN) ............................. 201841011089

(51) Int. Cl.
H04W 52/02　　(2009.01)
H04W 16/14　　(2009.01)
(Continued)

(52) U.S. Cl.
CPC ....... H04W 52/0248 (2013.01); H04W 16/14 (2013.01); H04W 72/23 (2023.01); H04W 74/006 (2013.01); *H04W 74/0808* (2013.01)

(58) Field of Classification Search
CPC ............. H04W 52/0248; H04W 52/02; H04W 74/006; H04W 74/0808; H04W 74/00;
(Continued)

(56) References Cited

U.S. PATENT DOCUMENTS 9,276,721　B2　3/2016　Seo et al.
9,392,592　B2　7/2016　Baker et al.
(Continued)

FOREIGN PATENT DOCUMENTS

CN　　107210871　A　9/2017
TW　　1507065　B　11/2015
(Continued)

OTHER PUBLICATIONS

3GPP TS 38.213: "3rd Generation Partnership Project, Technical Specification Group Radio Access Network, NR, Physical Layer Procedures for Control (Release 16)", 3GPP Standard, Technical Specification, 3GPP TS 38.213, 3rd Generation Partnership Project (3GPP), Mobile Competence Centre, 650, Route Des Lucioles, F-06921, Sophia-Antipolis, Cedex, France, vol. RAN WG1, No. V16.0.0, Dec. 2019, Jan. 14, 2020 (Jan. 14, 2020), XP051860806, pp. 1-146, Retrieved from the Internet: URL: http://ftp.3gpp.org/ Specs/archive/38_series/38.213/38213-g00.zip 38213-g00.docx [retrieved on Jan. 14, 2020], section 7.6.2, Section 10, Section 10.1, p. 100, Section 10.3, Paragraph [09.1], clause 7.2.1, p. 23-p. 25, clause 9, p. 49, paragraph 3 clause 9.1, p. 49, paragraph 4-paragraph 15 clause 9.1.1, p. 50, paragraph 5-paragraph 6 clause 9.1.2.1, p. 55 clause 9.1.3, p. 57, paragraph 8 clause 9.1.3.1, p. 61, paragraph 1-paragraph 2 clause 9.1.3.2, p. 63, paragraph 6, clause 9.1.3.3, p. 64, paragraph 1-p. 65, paragraph 10, p. 56. paragraph 6-p. 57, paragraph 1 ch, 9.2.3, p. 73, paragraph 5, p. 44, paragraph 8, p. 10, paragraph 1, p. 105-p. 106, tables 10.2-1. 10.2-2, paragraph [9.2.5].
(Continued)

*Primary Examiner* — Un C Cho
*Assistant Examiner* — Rasha K Fayed
(74) *Attorney, Agent, or Firm* — Harrity & Harrity, LLP

(57) ABSTRACT

Wireless communications systems and methods related monitoring the start of a transmission opportunity (TXOP) in unlicensed or shared frequency bands are provided. In one
(Continued)

embodiment, a first wireless communication device communicates, with a second wireless communication device, a first configuration including a set of first control channel monitoring periods outside of a TXOP. The first wireless communication device communicates, with the second wireless communication device, a communication signal during the TXOP based on a second control channel monitoring period longer than each of the first control channel monitoring periods. In one embodiment, a first wireless communication device communicates, with a second wireless communication device, a configuration including a first search space for a control channel monitoring outside of a TXOP and a second search space for a control channel monitoring within the TXOP, the second search space being partially-overlapped with the first search space.

26 Claims, 15 Drawing Sheets

(51) Int. Cl.

| | | |
|---|---|---|
| *H04W 72/23* | (2023.01) | |
| *H04W 74/00* | (2009.01) | |
| *H04W 74/0808* | (2024.01) | |

(58) Field of Classification Search
CPC .............. H04W 74/08; H04W 74/002; H04W 74/0875; H04W 74/004; H04W 74/0891; H04W 74/0816; H04W 72/14; H04W 72/1231; H04W 72/02; H04W 72/082; H04W 72/0426; H04W 72/04; H04W 72/1289; H04W 72/0453; H04W 72/23; H04W 72/566; H04W 72/232; H04W 72/53; H04W 72/0446; H04W 16/14; H04W 28/18; H04W 84/18; H04W 84/12; H04W 76/15; H04W 8/24; H04W 48/12; H04W 88/025; H04L 1/1671; H04L 1/0001; H04L 1/0026; H04L 1/0031; H04L 1/1812; H04L 1/1887; H04L 1/0068; H04L 1/0045; H04L 1/0075; H04L 1/0038; H04L 5/001; H04L 5/0053; H04L 5/0094; H04L 5/0092; H04L 5/0098; H04L 5/0069; H04L 5/0007; Y02D 30/70; H04B 7/0617
See application file for complete search history.

(56) References Cited

U.S. PATENT DOCUMENTS

| | | | | |
|---|---|---|---|---|
| 9,445,409 | B2 | 9/2016 | Liao et al. | |
| 10,382,270 | B2 | 8/2019 | You et al. | |
| 10,568,116 | B2 | 2/2020 | Park et al. | |
| 10,568,135 | B2 | 2/2020 | Park et al. | |
| 10,631,280 | B2 | 4/2020 | Baldemair et al. | |
| 10,945,209 | B2 | 3/2021 | Kim et al. | |
| 10,952,199 | B2 | 3/2021 | Kim et al. | |
| 11,166,285 | B2 | 11/2021 | Kim et al. | |
| 11,212,747 | B2 | 12/2021 | Zhou et al. | |
| 11,546,940 | B2 | 1/2023 | Hedayat et al. | |
| 2005/0136940 | A1* | 6/2005 | An | H04W 68/00 |
| | | | | 455/574 |
| 2008/0031172 | A1 | 2/2008 | Nanda et al. | |
| 2008/0031222 | A1* | 2/2008 | Nanda | H04W 72/02 |
| | | | | 370/350 |
| 2008/0031223 | A1 | 2/2008 | Nanda et al. | |
| 2010/0002590 | A1* | 1/2010 | Park | H04W 74/006 |
| | | | | 370/329 |
| 2011/0225440 | A1* | 9/2011 | Kwon | H04W 52/0225 |
| | | | | 455/127.5 |
| 2012/0182963 | A1* | 7/2012 | Kneckt | H04W 72/0453 |
| | | | | 370/330 |
| 2015/0181620 | A1 | 6/2015 | Seok | |
| 2015/0215959 | A1* | 7/2015 | Nanda | H04W 72/542 |
| | | | | 370/329 |
| 2016/0254948 | A1 | 9/2016 | Chen et al. | |
| 2017/0019924 | A1* | 1/2017 | Wang | H04L 5/005 |
| 2017/0048861 | A1 | 2/2017 | Choi et al. | |
| 2017/0171908 | A1 | 6/2017 | Agarwal et al. | |
| 2017/0188336 | A1 | 6/2017 | Ahn et al. | |
| 2017/0245302 | A1* | 8/2017 | Mukherjee | H04W 16/14 |
| 2017/0257850 | A1 | 9/2017 | Oh et al. | |
| 2017/0272322 | A1* | 9/2017 | You | H04L 41/0853 |
| 2017/0303136 | A1 | 10/2017 | Park et al. | |
| 2018/0084581 | A1 | 3/2018 | Terry | |
| 2018/0092073 | A1* | 3/2018 | Nogami | H04W 52/16 |
| 2018/0103390 | A1* | 4/2018 | Zhou | H04W 28/0252 |
| 2018/0184302 | A1* | 6/2018 | Zhang | H04W 72/56 |
| 2018/0192405 | A1* | 7/2018 | Gong | H04L 1/0045 |
| 2018/0220485 | A1 | 8/2018 | Su et al. | |
| 2018/0242373 | A1 | 8/2018 | Wang et al. | |
| 2018/0270860 | A1 | 9/2018 | Bhorkar et al. | |
| 2018/0288805 | A1 | 10/2018 | Bhorkar et al. | |
| 2018/0302195 | A1 | 10/2018 | Kim et al. | |
| 2018/0368164 | A1 | 12/2018 | Lunden et al. | |
| 2019/0053222 | A1* | 2/2019 | Bhorkar | H04W 16/14 |
| 2019/0053293 | A1* | 2/2019 | Akoum | H04W 72/23 |
| 2019/0059085 | A1 | 2/2019 | Sun et al. | |
| 2019/0069324 | A1* | 2/2019 | Ansari | H04W 16/14 |
| 2019/0075562 | A1* | 3/2019 | Cariou | H04W 74/002 |
| 2019/0104514 | A1 | 4/2019 | Chendamarai Kannan et al. | |
| 2019/0158205 | A1* | 5/2019 | Sheng | H04L 5/0048 |
| 2019/0246425 | A1* | 8/2019 | Zhang | H04W 74/0833 |
| 2019/0268931 | A1 | 8/2019 | He et al. | |
| 2019/0297579 | A1 | 9/2019 | Bhattad et al. | |
| 2019/0313383 | A1 | 10/2019 | Xiong et al. | |
| 2019/0313453 | A1* | 10/2019 | Baron | H04W 74/006 |
| 2020/0008241 | A1 | 1/2020 | Zhou | |
| 2020/0059321 | A1* | 2/2020 | Koorapaty | H04L 5/0053 |
| 2020/0163062 | A1* | 5/2020 | Takeda | H04W 8/24 |
| 2020/0187236 | A1 | 6/2020 | Moon et al. | |
| 2020/0236699 | A1* | 7/2020 | Nakashima | H04L 5/0053 |
| 2020/0245355 | A1 | 7/2020 | Mueck et al. | |
| 2020/0260442 | A1* | 8/2020 | Yi | H04L 5/14 |
| 2020/0275486 | A1* | 8/2020 | Viger | H04W 74/0808 |
| 2020/0305193 | A1 | 9/2020 | Kim et al. | |
| 2020/0314898 | A1 | 10/2020 | Sun et al. | |
| 2020/0344792 | A1* | 10/2020 | Liu | H04W 72/23 |
| 2020/0367253 | A1* | 11/2020 | Kim | H04W 24/08 |
| 2021/0050944 | A1* | 2/2021 | Zhang | H04L 5/0053 |
| 2021/0204324 | A1 | 7/2021 | Viger et al. | |
| 2021/0368367 | A1* | 11/2021 | Jiang | H04W 52/02 |
| 2022/0141805 | A1 | 5/2022 | Tooher et al. | |
| 2024/0389144 | A1 | 11/2024 | Sun et al. | |

FOREIGN PATENT DOCUMENTS

| | | |
|---|---|---|
| TW | 201722182 A | 6/2017 |
| WO | 2017213759 A1 | 12/2017 |
| WO | WO-2018127802 A1 | 7/2018 |
| WO | WO-2020060931 | 3/2020 |

OTHER PUBLICATIONS

Apple Inc: "NR Unlicensed Considerations", 3GPP Draft; R1-1802287_ NR Unlicensed Considerations, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 17, 2018 (Feb. 17, 2018), pp. 1-5, XP051397817, Retrieved from the Internet: URL: http://www.3gpp.org/ftp/tsg_ran/WG1_RL1/TSGR1_92/Docs/ [retrieved on Feb. 17, 2018], Mini-slot and Configurable Search Space Monitoring, p. 2.
International Search Report and Written Opinion—PCT/US2019/024099—ISA/EPO—May 27, 2019.
Qualcomm Incorporated: "DL Signals and Channels for NR-U," 3GPP Draft; 3GPP TSG RAN WG1 Meeting #96, R1-1902983

(56)  References Cited

OTHER PUBLICATIONS 7.2.2.1.2, DL Signals and Channels for NR-U, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 16, 2019 (Feb. 16, 2019), XP051600680, 8 pages, Retrieved from the Internet: URL: http://www.3gpp.org/ftp/tsg%5Fran/WG1%5FRL1/TSGR1%5F96/Docs/R1%2D1902983%2Ezip [retrieved on Feb. 16, 2019], sections 2, 4, 7.

Qualcomm Incorporated: "TxOP Frame Structure for NR Unlicensed", 3GPP Draft; R1-1802866, 3GPP TSG RAN WG1 Meeting #92, 7.6.5 Frame Structure for NR Unlicensed, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 17, 2018 (Feb. 17, 2018), pp. 1-5, XP051398279, Retrieved from the Internet: URL: http://www.3gpp.org/ftp/tsg_ran/WG1_RL1/TSGR1_92/Docs/ [retrieved on Feb. 17, 2018], Section 3.1 Channel usage indication, Figure 3, p. 3; 3.2 CSI determination, Proposal 2, p. 4; Figure 6, p. 4; 4.Data transmission stage.

ZTE: "Considerations on DL Reference Signals and Channels Design for NR-U", 3GPP Draft, 3GPP TSG RAN WG1 Meeting #95, R1-1812433, Considerations on DL reference Signals and Channels Design for NR-U Final, 3rd Generation Partnership Project (3GPP), Mobile Competence Centre, 650, Route Des Lucioles, F-06921, Sophia-Antipolis Cedex, France, vol. RAN WG1, No. Spokane, USA; Nov. 12, 2018-Nov. 16, 2018, Nov. 11, 2018 (Nov. 11, 2018), XP051554348, 8 pages, Retrieved from the Internet: URL: http://www.3gpp.org/ftp/Meetings%5F3GPP%5FSYNC/RAN1/Docs/R1%2D1812433%2Ezip [retrieved on Nov. 11, 2018], sections 2.2, 2.3.

ZTE, et al., "Discussion on NR Operation in Unlicensed Spectrum", 3GPP Draft, 3GPP TSG RAN WG1 Meeting #88, R1-1701619-8. 1.10 Discussion on NR Operation In Unlicensed Spectrum, 3rd Generation Partnership Project (3GPP), Mobile Competence Centre, 650, Route Des Lucioles, F-06921 Sophia-Antipo, vol. RAN WG1, No. Athens, Greece, Feb. 13, 2017-Feb. 17, 2017, Feb. 12, 2017 (Feb. 12, 2017), XP051208786, 8 Pages, Retrieved from the Internet: URL:http://www.3gpp.org/ftp/Meetings_3GPP_SYNC/RAN1/Docs/ [retrieved on Feb. 12, 2017], Minimization of Reservation Signal with Flexible TTI Size Setting, p. 4, p. 5; Resource Allocation, p. 5.

ZTE., et al., "Framework on Potential Solutions and Techniques for NR-U", 3GPP Draft; R1-1801466-7.6.4 Framework on Potential Solutions and Techniques for NR-U, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 17, 2018 (Feb. 17, 2018), pp. 1-8, XP051397565, Retrieved from the Internet: URL: http://www.3gpp.org/ftp/tsg_ran/WG1_RL1/TSGR1_92/Docs/ [retrieved on Aug. 17, 2018], High Frequency/Beam-Based LBT, p. 3 and p. 4.

European Search Report—EP23172283—Search Authority—The Hague—Aug. 8, 2023.

Fujitsu: "Discussion on Time Domain Resource Allocation", 3GPP TSG RAN WG1 Meeting #90, R1-1712742 Discussion on Time Domain Resource Allocation Final, 3rd Generation Partnership Project (3GPP), Mobile Competence Centre, 650, Route Lucioles, F-06921 Sophia-Antipolis Ced, vol. RAN WG1, No. Prague, Czech Republic, Aug. 21, 2017-Aug. 25, 2017, 4 Pages, Aug. 20, 2017, XP051315555, Discussion, p. 2, paragraph 2-p. 3.

LG Electronics: "Control Design for D2d Broadcast Communication", 3GPP TSG RAN WG1 Meeting #76bis, R1-141349, No. Shenzhen, China, Mar. 31, 2014-Apr. 4, 2014, 6 Pages, Mar. 22, 2014.

Taiwan Search Report—TW109107838—TIPO—Jan. 16, 2024.

FUJITSU: "Discussion on Time Domain Resource Allocation", 3GPP TSG RAN WG1 Meeting #90, R1-1712742, Discussion on Time Domain Resource Allocation Final, 3rd Generation Partnership Project, Mobile Competence Centre, 650, Route Lucioles, F-06921 Sophia-Antipolis Ced, vol. RAN WG1, No. Prague, Czech Republic, Aug. 21, 2017-Aug. 25, 2017, pp. 1-4, Aug. 20, 2017, XP051315555.

* cited by examiner

1500

1600

Communicate configuration include first search space for control channel monitoring outside of TXOP and a second search space for control channel monitoring within TXOP, second search space partially-overlapped with first search space    ~1610

Communicate communication signal during TXOP based on second search space    ~1620

POWER OPTIMIZATIONS FOR TRANSMISSION OPPORTUNITY (TXOP) MONITORING

CROSS REFERENCE TO RELATED APPLICATIONS

The present application is a continuation of U.S. patent application Ser. No. 16/363,654, filed Mar. 25, 2019, which claims priority to and the benefit of India Patent Application No. 201841011089, filed Mar. 26, 2018, each of which is hereby incorporated by reference in its entirety as if fully set forth below and for all applicable purposes.

TECHNICAL FIELD

This application relates to wireless communication systems, and more particularly to reducing power consumptions on start of transmission opportunity (TXOP) monitoring in unlicensed or shared frequency bands.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR may operate over a wider bandwidth (BW) at higher frequencies than LTE. In addition, NR may operate across different spectrum types, from licensed spectrum to unlicensed and shared spectrum. Spectrum sharing enables operators to opportunistically aggregate spectrums to dynamically support high-BW services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a BS may perform an LBT in a shared channel. When the LBT passes indicating a TXOP is available in the shared channel, the BS may schedule a UE for communications over the shared channel during the TXOP. The UE may be synchronized to the BS. The BS and the UE may communicate based on a common timeline. For example, the BS may schedule the UE at certain scheduling intervals, which may be referred to as slots, and the UE may monitor for a scheduling grant from the BS at the boundaries of the slots. However, the time when an LBT passes or when a TXOP starts may not align to a slot boundary. Thus, the BS may have to wait till the next scheduling slot to schedule a UE.

To allow for a faster medium access or scheduling, the BS may schedule the UE using a shorter scheduling interval, which may be referred to as a mini-slot, and the UE may monitor for a scheduling grant from the BS at mini-slot boundaries. Thus, upon passing an LBT, the BS may schedule the UE at a mini-slot boundary for communications in a mini-slot, instead of waiting till the next slot. While the use of mini-slots for scheduling and monitoring can allow for a faster medium access or scheduling, the UE is required to perform the monitoring more frequently between TXOPs in order to detect a mini-slot schedule from the BS upon the start of a TXOP. In some instances, the BS may not gain access to the shared channel for a long period of time due to contention. However, the UE may continue to perform the more frequent mini-slot monitoring, and thus may consume a large amount of power unnecessarily.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a first configuration including a set of first control channel monitoring periods outside of a transmission opportunity (TXOP); and communicating, by the first wireless communication device with the second wireless communication device, a communication signal during the TXOP based on a second control channel monitoring period longer than each of the first control channel monitoring periods.

In an additional aspect of the disclosure, an apparatus includes a transceiver configured to communicate, with a second wireless communication device, a first configuration including a set of first control channel monitoring periods outside of a transmission opportunity (TXOP); and communicate, with the second wireless communication device, a communication signal during the TXOP based on a second control channel monitoring period longer than each of the first control channel monitoring periods.

In an additional aspect of the disclosure, a computer-readable medium having program code recorded thereon, the program code includes code for causing a first wireless communication device to communicate, with a second wireless communication device, a first configuration including a set of first control channel monitoring periods outside of a transmission opportunity (TXOP); and code for causing the first wireless communication device to communicate, with the second wireless communication device, a communication signal during the TXOP based on a second control channel monitoring period longer than each of the first control channel monitoring periods.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
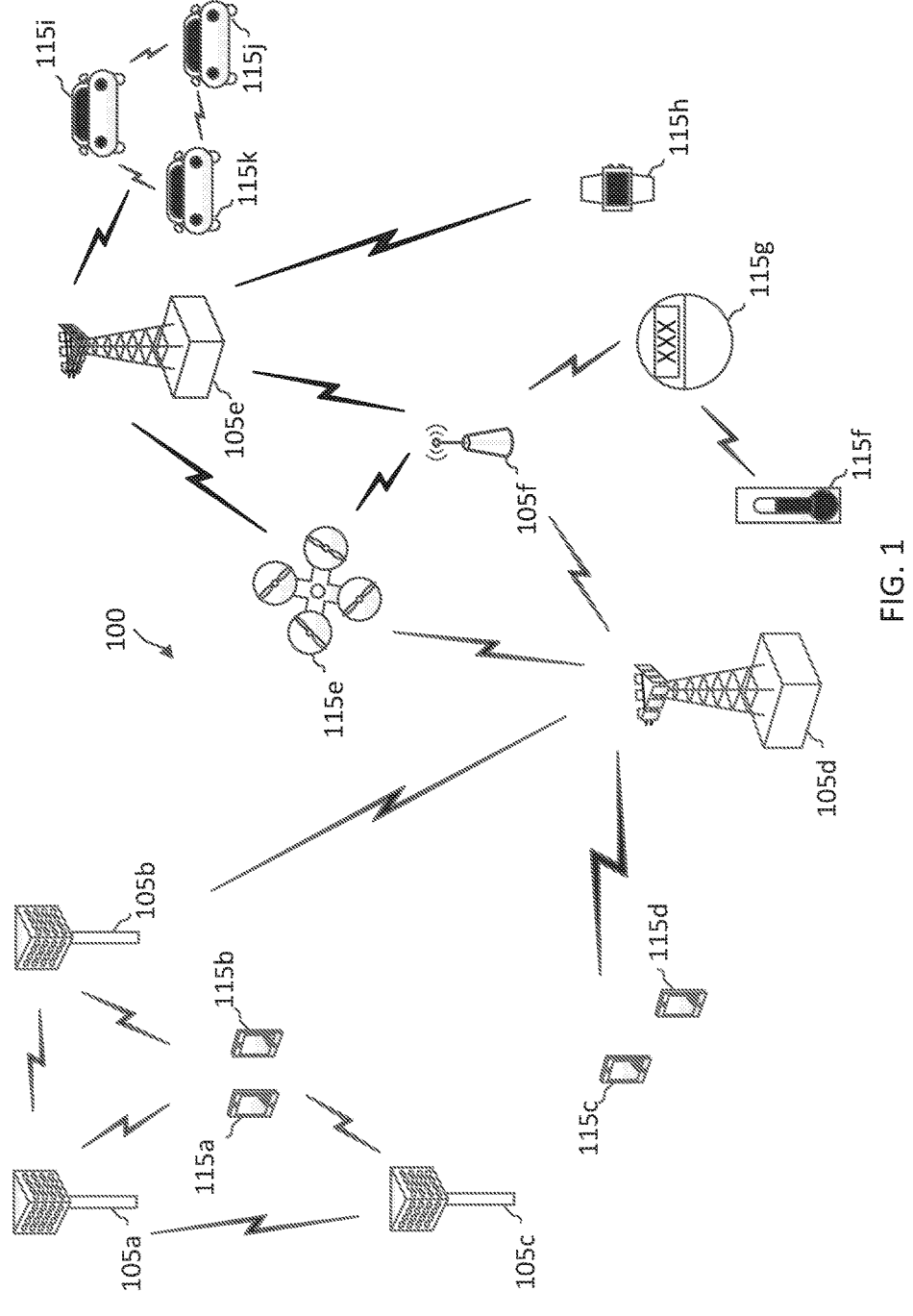
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (PUMA) networks, orthogonal FDMA (OFDMA) networks, single-carrier PUMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (BUD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for reducing power consumptions on start of transmission opportunity (TXOP) monitoring and control channel monitoring in a shared channel including unlicensed and/or shared frequency bands. In the disclosed embodiments, a BS may configure a UE to perform DL control channel monitoring in a shared channel using a low-latency monitoring mode or a normal monitoring mode outside of a TXOP or within a TXOP. The low-latency monitoring mode uses a shorter monitoring period than the normal monitoring mode. In the low-latency monitoring mode, a UE may monitor a DL control channel for a scheduling grant from the BS at a mini-slot boundary. In the normal monitoring mode, a UE may monitor a DL control channel for a scheduling grant from the BS at a slot boundary, where a slot may include multiple mini-slots. The mini-slot level monitoring with the shorter monitoring time period can provide a greater scheduling flexibility for the BS upon the BS gaining an access to a TXOP, but can lead to a higher power consumption at the UE. The BS may configure the UE to dynamically switch between the low-latency monitoring mode and the normal monitoring mode outside of a TXOP or within a TXOP to balance between UE power consumption and BS scheduling flexibility.

In an embodiment, the BS may assign different UEs with different subsets of mini-slots outside of a TXOP for monitoring. For example, the BS may assign a UE with a set of mini-slots interleaving with another set of mini-slots assigned to another UE. Alternatively, the BS may assign a UE with groups of consecutive or contiguous mini-slots. The monitoring of a subset of mini-slots instead of all mini-slots outside of a TXOP can reduce power consumption at the UE while providing the BS with a scheduling flexibility at the mini-slot level. The disclosed embodiments can provide further scheduling flexibility by allowing the BS to transmit a scheduling grant to a UE in a DL control channel of a mini-slot for a communication with the UE in a longer period than the mini-slot.

In an embodiment, the BS may instruct a UE to skip or delay DL control channel monitoring for a time period after the end of a TXOP. For example, at the end of a TXOP, the BS may perform a random backoff before performing an LBT for a next TXOP. The BS may instruct the UE to defer DL control channel monitoring for at least a duration of the random backoff period while the BS does not have access to the shared channel.

In an embodiment, the BS may instruct a UE to enable or disable DL control channel monitoring based on beam directions. For example, the BS may communicate with a first set of UEs using a first set of beam directions in a current TXOP. The BS may determine a second set of UEs to be scheduled for communications using a second set of beam directions in a next TXOP, where the second set of beam directions is different from the first set of beam directions. The BS may instruct the first set of UEs to disable DL control channel monitoring at the end of the current TXOP and may instruct the second set of UEs to enable DL control channel monitoring at the end of the current TXOP. Thus, the first set of UEs can avoid monitoring unnecessarily while the BS intends to communicate using the second set of beam directions for the next TXOP. In some embodiments, the enable and/or disable instructions can further indicate the beam indices associated with the first set or the second set of beam directions.

In some embodiments, the BS may configure search spaces or control channel resource sets (CORSETs) for the monitoring such that a UE that misses the start of a TXOP may be able to detect the presence of a TXOP. For example, the BS may configure a first search space for DL control channel monitoring outside of a TXOP and a second search space for DL control channel monitoring within a TXOP, where the first search space may partially overlapped with the second search space. Thus, a UE that misses the start of a TXOP may be able to detect a scheduling grant from an overlapping portion of the first and second search spaces.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of 3 dimension (3D), full dimension (PD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115*a*-115*d* are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, and cell barring. After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged.

In an embodiment, the network 100 may operate over a shared channel, which may include a shared frequency bands or an unlicensed frequency band, for example, at about 3.5 gigahertz (GHz), sub-6 GHz or higher frequencies in the mmWav band. In such an embodiment, the BSs 105 and the UEs 115 may be operated by multiple network operating entities. To avoid collisions, the BSs 105 and the UEs 115 may employ a listen-before-talk (LBT) procedure to gain access to the shared channel. For example, a BS 105 may perform an LBT in the shared channel. When the LBT passes indicating a TXOP is available in the shared channel, the BS 105 may schedule a UE 115 for communications over the shared channel during the TXOP. In order for the UE 115 to detect a schedule from the BS 105 upon the start of the TXOP, the UE 115 is required to monitor the shared channel between while the BS 105 does not have access to the shared channel. In other words, the UE 115 is required to monitor the shared channel for a schedule from the BS 105 between TXOPs.

To reduce power consumption at the UE 115, the BS 105 may configure the UE 115 to perform the monitoring at certain time intervals between TXOPs. For example, the BS 105 may configure the UE 115 to monitor only a portion of time between TXOPs. The BS 105 may configure the UE 115 with a low-latency monitoring mode with short monitoring intervals (e.g., at a mini-slot granularity) or a normal monitoring mode with longer monitoring intervals (e.g., at a slot granularity). The BS 105 may determine the monitoring configuration based on of random backoff that is needed for a next LBT and/or expected beam directions for communications in a next TXOP. The BS 105 may dynamically configure the UE 115 to switch between the low-latency monitoring mode and the normal monitoring mode. The BS 105 may provide the UE 115 with certain control channel resource configurations for the monitoring. Mechanisms for configuring scheduling and monitoring between TXOPs and/or within TXOPs are described in greater detail herein.

Figure 2:
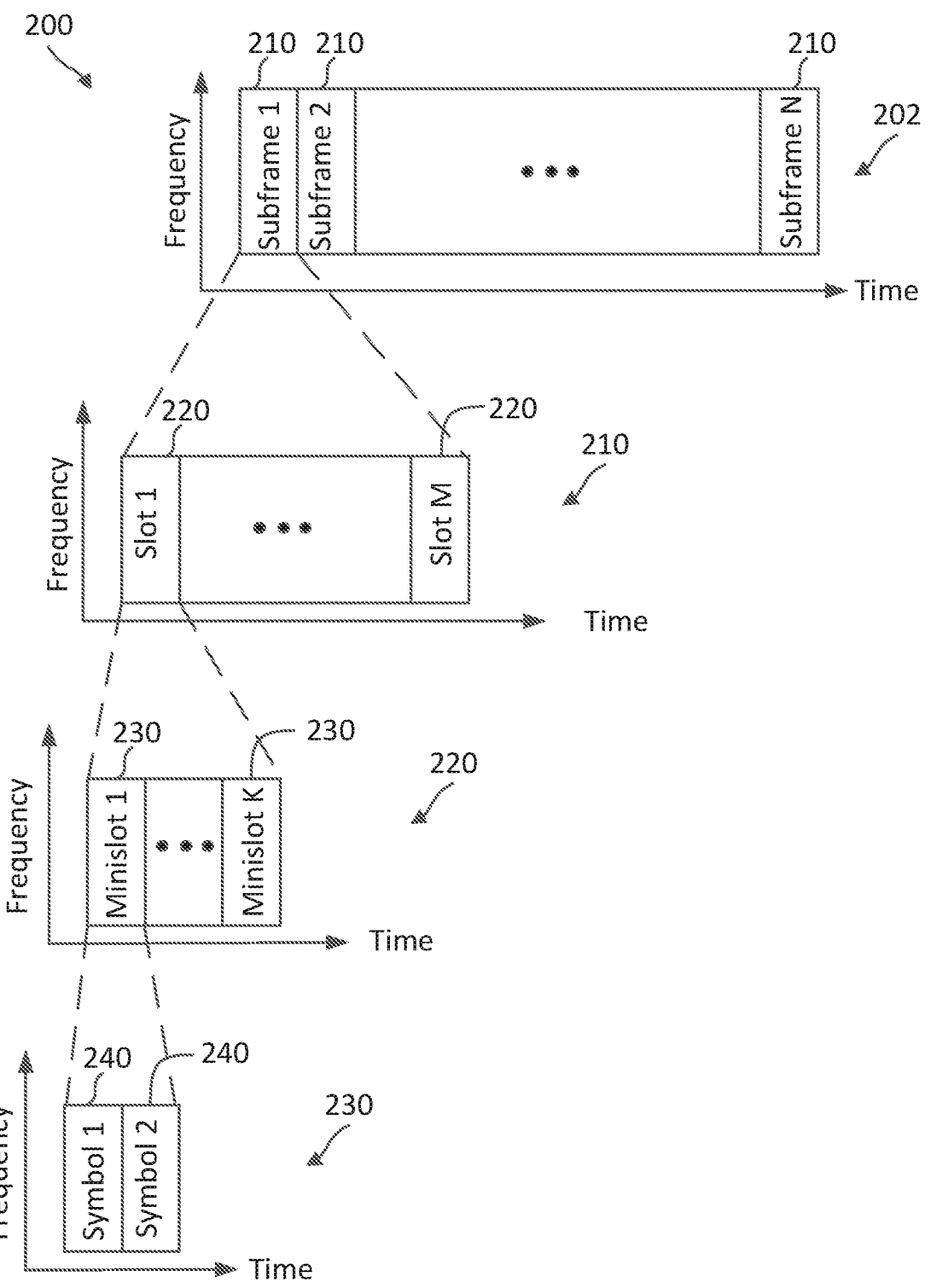
FIG. 2 illustrates a communication frame configuration according to some embodiments of the present disclosure.

FIG. 2 illustrates a communication frame configuration 200 according to embodiments of the present disclosure. The configuration 200 may be employed by the networks 100. In particular, BSs such as the BSs 105 and UEs such as the UEs 115 may communicate with each other using the configuration 200. In FIG. 2, the x-axes represent time in some constant units and the y-axes represent frequency in some constant units. The configuration includes a radio frame 202. The radio frame 202 includes N plurality of subframes 210 spanning in time and frequency. In an embodiment, a radio frame 202 may span a time interval of about 10 milliseconds (ms). Each subframe 210 includes M plurality of slots 220. Each slot 220 includes K plurality of mini-slots 230. Each mini-slot 230 may include a variable number of symbols 240. N, M, and K may be any suitable positive integers.

In some embodiments, N may be about 10 and M may be about 14. In other words, a radio frame 202 may include about 10 subframes 210 and each subframe 210 may include about 14 symbols 240. A BS may schedule a UE for a DL communication or a UL communication in a subframe 210, a slot 220, or in a mini-slot 230. In other words, a scheduling interval or a transmission time interval (TTI) may be at a granularity of a subframe 210, a slot 220, or in a mini-slot 230. A TTI may refer to a duration of transmission for a transport block (TB) on a radio link. A TB refers to a physical layer transmission frame carrying encapsulated higher network layer data. In some instances, multiple TBs may be transmitted in a TTI when multiple spatial layers are used for the transmissions.

In some embodiments, a BS may transmit a scheduling grant to a UE over a DL control channel. The BS may allocate certain resources in a subframe 210, in a slot 220, and/or in a mini-slot 230 for DL control channel communication. In the context of LTE or NR, the DL control channel may be referred to as a physical downlink control channel (PDCCH) and the DL control channel resources may be referred to as a CORSET.

Figure 3:
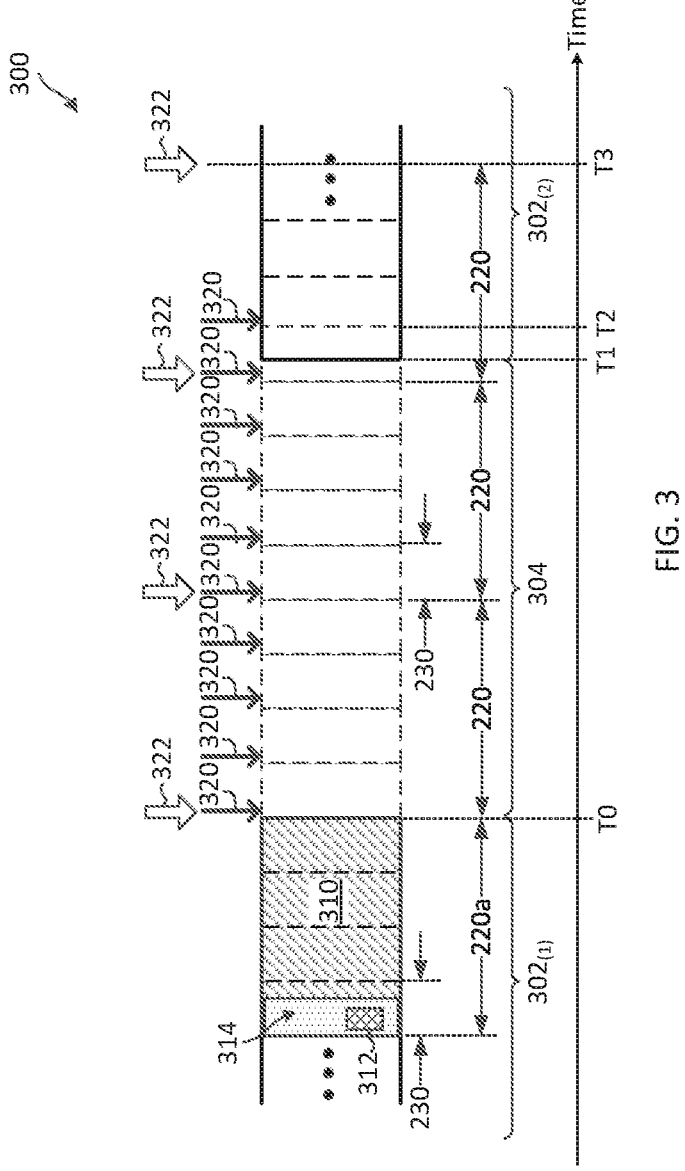
FIG. 3 illustrates a communication scenario according to embodiments of the present disclosure.

FIG. 3 illustrates a communication scenario 300 according to embodiments of the present disclosure. The scenario 300 may correspond to a communication scenario over an unlicensed or shared frequency band in the network 100, where a BS 105 may schedule a UE 115 for UL and/or DL communications in a slot 220 or in a mini-slot 230. In FIG. 3, the x-axis represents time in some constant units. FIG. 3 illustrates four mini-slots 230 in each slot 220 for purposes of simplicity of discussion, though it will be recognized that embodiments of the present disclosure may scale to include any suitable number of minis-slots 230 (e.g., about 14) in a slot 220. As shown in the scenario 300, a BS (e.g., the BSs 105) may gain a TXOP 302$_{(1)}$ in a shared channel, for example, after passing an LBT in the shared channel. The TXOP 302$_{(1)}$ may include a plurality of slots 220. The BS may schedule the UE for a communication 310 in a slot 220$a$ within the TXOP 302$_{(1)}$. For example, the BS may transmit a scheduling grant 312 for the UE in a DL control channel region 314 located at the beginning of the slot 220$a$. The UE may perform DL control channel monitoring in the DL control channel region 314 of the slot 220$a$. Upon detecting the scheduling grant 312, the BS and the UE may proceed with the scheduled communication 310 in the slot 220$a$.

At the end of the TXOP 302$_{(1)}$, for example, at time T0, the BS may perform another LBT in the shared channel. In order for the UE to detect a schedule from the BS in a next TXOP 302$_{(2)}$, the UE may perform DL control channel monitoring after the end of the TXOP 302$_{(1)}$. The UE may perform the DL control channel monitoring at a granularity of a mini-slot 230 (shown by the arrows 320) or at a granularity of a slot 220 (shown by the arrows 322) in a time period 304 while the BS does not have access to the shared channel. The time period 304 may be referred to as a LBT-gap period.

At time T1, the BS may determine that the LBT is successful. Thus, the BS may have another TXOP 302$_{(2)}$ in the shared channel. The BS may schedule the UE for a communication in the TXOP 302$_{(2)}$. Depending on the time when the LBT passes and whether the UE monitors the DL control channel at a granularity of a mini-slot 230 or at a granularity of a slot 220, the BS may have to wait for a certain time period before scheduling the UE after gaining access to the shared channel. For example, when the UE performs DL control channel monitoring at a mini-slot 230 boundary, the BS may schedule the UE at a next mini-slot 230 boundary in the TXOP 302$_{(2)}$, for example, at time T2. Alternatively, when the UE performs DL control channel monitoring at a slot 220 boundary, the BS may have to wait till a next slot 220 in the TXOP 302$_{(2)}$, for example, at time T3, to schedule the UE.

As can be seen, the BS may configure the UE to perform DL control channel monitoring at a granularity of a mini-slot 230 while waiting for a next TXOP 302$_{(2)}$ (e.g., in the period 304) to achieve a faster medium access and/or to provision for a lower-latency communication when the BS gains the TXOP 302$_{(2)}$. However, the UE may consume more power when monitoring at a granularity of a mini-slot 230 than at a granularity of a slot 220. Thus, there is a trade-off between UE power consumption and medium access time or scheduling flexibility. Mechanisms for optimizing UE power consumptions for monitoring the start of a TXOP 302 are described in greater detail herein.

Figure 4:
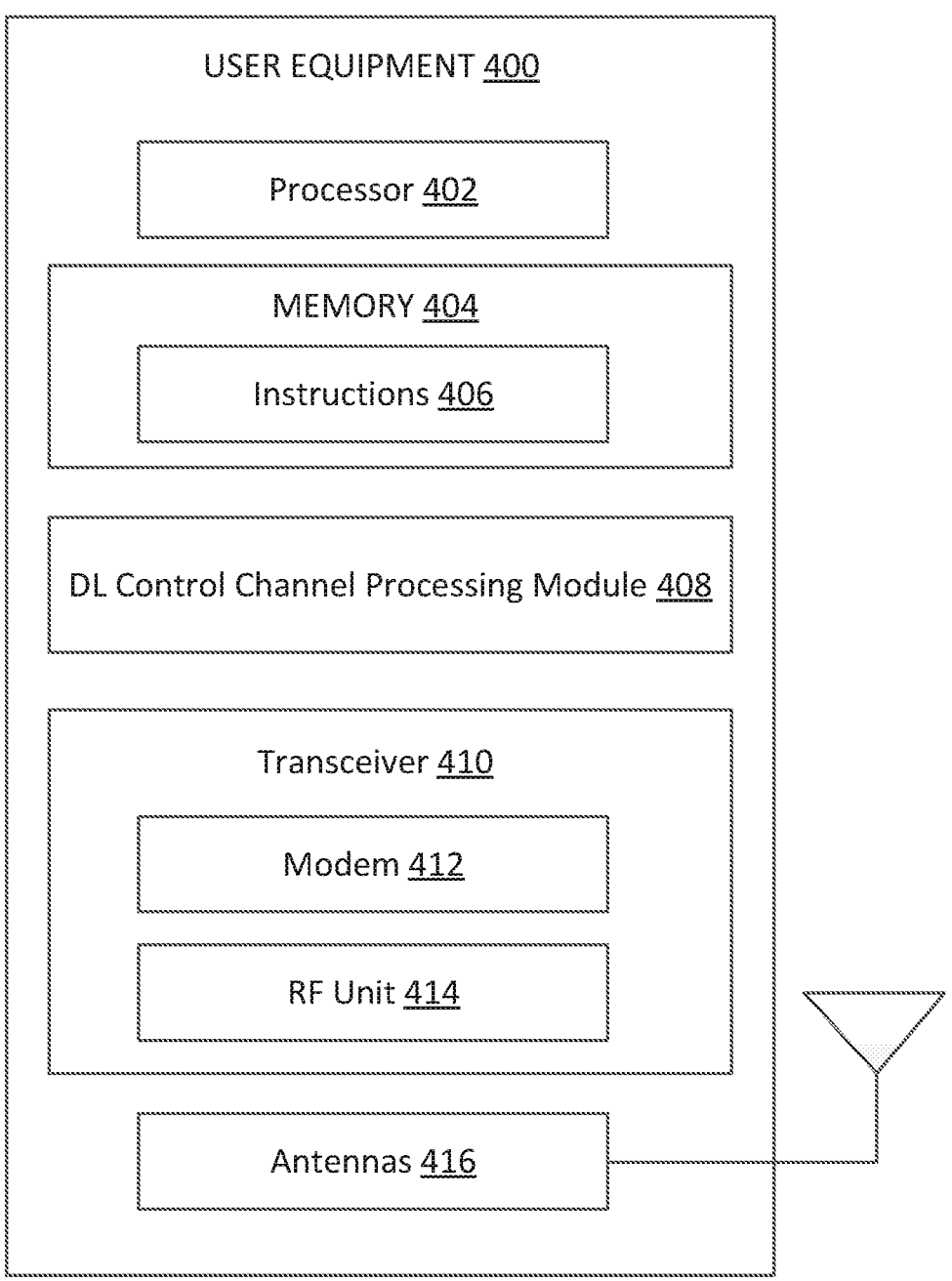
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 as discussed above. As shown, the UE 400 may include a processor 402, a memory 404, a DL control channel processing module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure, for example, aspects of FIGS. 6-16. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The DL control channel processing module 408 may be implemented via hardware, software, or combinations thereof. For example, the DL control channel processing module 408 may be implemented as a processor, circuit, and/or instructions 406 stored in the memory 404 and executed by the processor 402. The DL control channel processing module 408 may be used for various aspects of the present disclosure, for example aspects of FIGS. 6-16. For example, the DL control channel processing module 408 is configured to receive a DL control channel monitoring configuration, a DL control channel resource configuration, and/or DL control channel monitoring disable/enable instructions from a BS (e.g., the BSs 105), monitor for downlink control information (DCI) (e.g., the scheduling grant 312) from the BS during TXOPs and between TXOPs (e.g., LBT gap time) based on the received DL control channel monitoring configuration, the received DL control channel resource configuration, and/or the received instructions, switching between low-latency and normal monitoring modes based on the received DL control channel monitoring configuration, detect the start of a TXOP (e.g., when the BS gain access to a shared channel), and/or communicate with the BSs based on the received DCI during TXOPs, as described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the DL control channel processing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/ encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
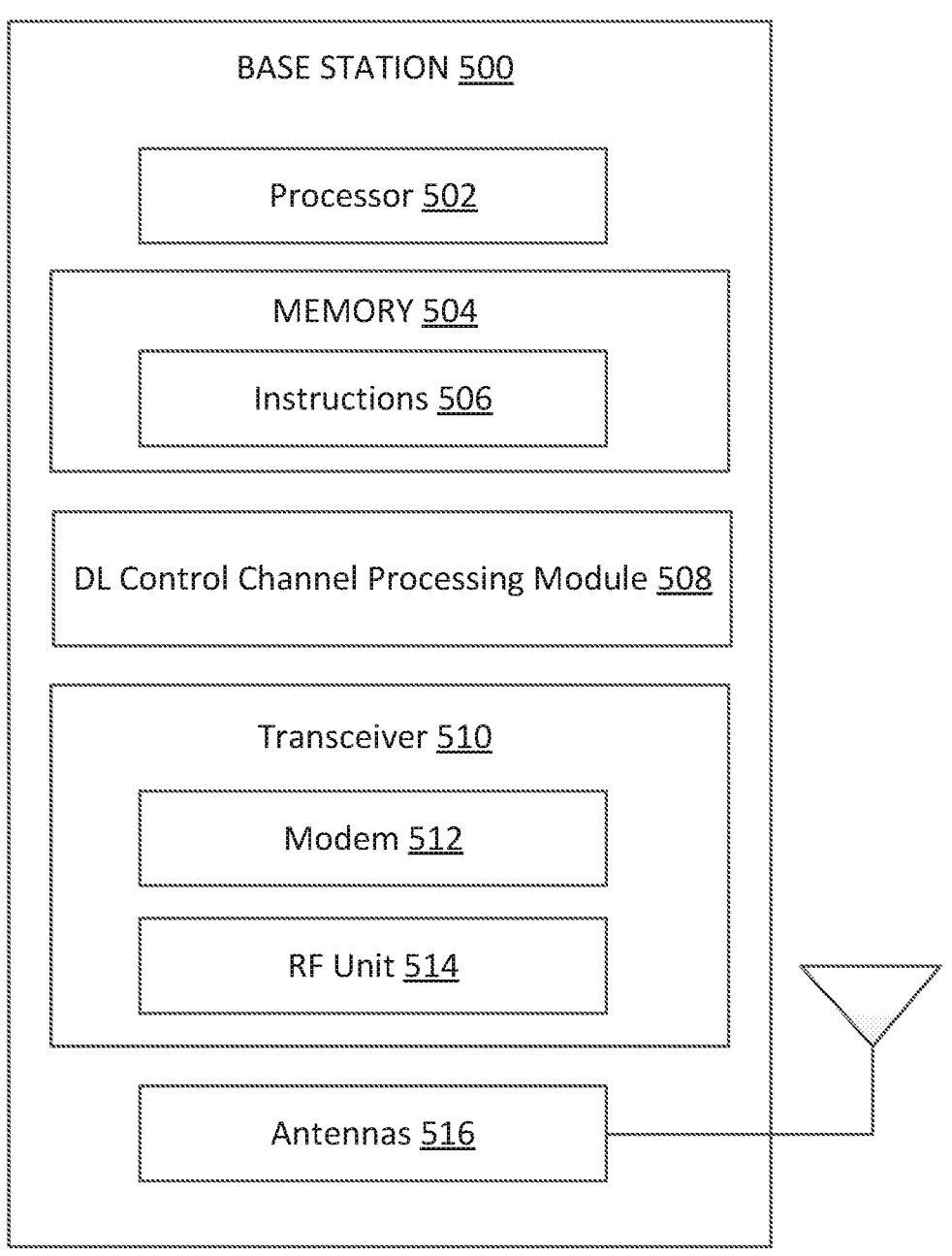
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 as discussed above. A shown, the BS 500 may include a processor 502, a memory 504, a DL control channel processing module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 504 may store instructions 506. The instructions 506 may include instructions that, when executed by the processor 502, cause the processor 502 to perform operations described herein, for example, aspects of FIGS. 6-16.

Instructions 506 may also be referred to as code, which may be interpreted broadly to include any type of computer-readable statement(s) as discussed above with respect to FIG. 4.

The DL control channel processing module 508 may be implemented via hardware, software, or combinations thereof. For example, the DL control channel processing module 508 may be implemented as a processor, circuit, and/or instructions 506 stored in the memory 504 and executed by the processor 502. The DL control channel processing module 508 may be used for various aspects of the present disclosure, for example, aspects of FIGS. 6-16. For example, the DL control channel processing module 508 is configured to determine DL control channel monitoring configurations and/or DL control channel resource configurations for within TXOPs and outside of TXOPs, transmit the DL control channel monitoring configurations and/or DL control channel resource configurations to UEs (e.g., the UEs 115), trigger the UEs to switching between low-latency and normal monitoring modes, perform UL and/or DL scheduling, transmit UL and/or DL scheduling grants (e.g., the scheduling grant 312 carried in DCI) to the UEs, and/or communicate with the UEs based on the scheduling grants, as described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices and provide the received data messages for processing and/or demodulation at the transceiver 510. The antennas 516 may include multiple antennas of similar or different designs in order to sustain multiple transmission links.

As described above, the low-latency DL control channel monitoring can provide a faster channel access and/or a lower-latency communication, but can lead to higher power consumption at UEs (e.g., the UEs 115). FIGS. 6-12 illustrate various DL control channel monitoring and/or scheduling mechanisms that can balance between UE power consumptions and BS scheduling flexibility. In FIGS. 6-12, the x-axes represent time in some constant units.

Figures 6, 7:
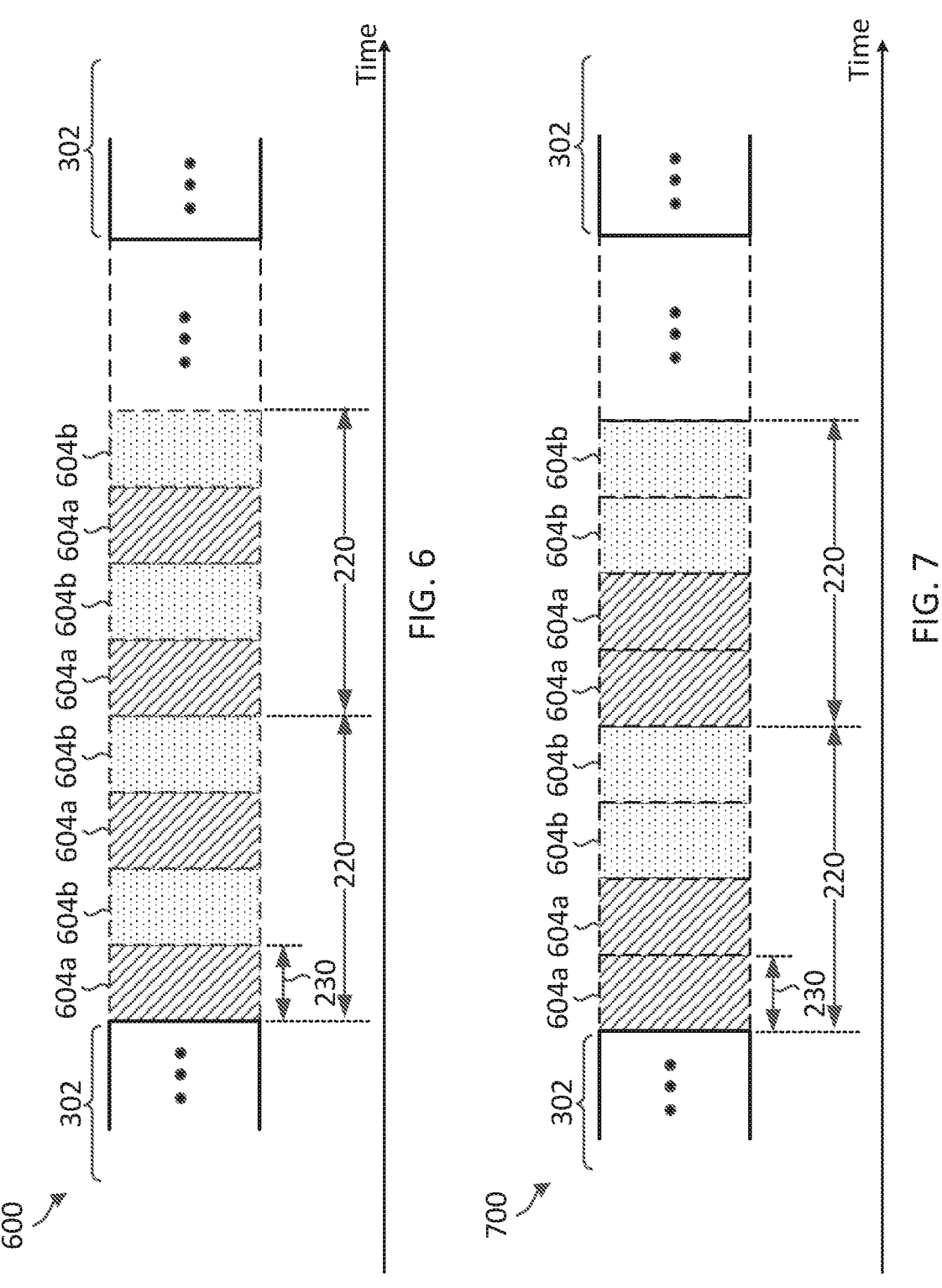
FIG. 6 illustrates a downlink (DL) control channel monitoring configuration scheme according to some embodiments of the present disclosure.
FIG. 7 illustrates a DL control channel monitoring configuration scheme according to some embodiments of the present disclosure.

FIG. 6 illustrates a DL control channel monitoring configuration scheme 600 according to some embodiments of the present disclosure. The scheme 600 may be employed by BSs (e.g., the BSs 105 and 500) and UEs (e.g., the UEs 115 and 400) in a network (e.g., the network 100). In the scheme 600, the BS may configure different UEs with different subsets of DL control channel monitoring periods 604 outside of a TXOP 302. Each monitoring period 604 may correspond to a mini-slot 230. As an example, the BS may configure a UE A with a first subset of monitoring periods 604a and may configure a UE B with a second subset of monitoring periods 604b. The monitoring periods 604a may be spaced apart from each other and time-interleaving with the monitoring periods 604b. The UE A may monitor for a schedule from the BS at the beginning of the monitoring periods 604a (e.g., in a DL control channel region 314) and may sleep (e.g., powering off at least a portion of a receiver) during the monitoring periods 604b assigned to the UE B. Similarly, the UE B may monitor for a schedule from the BS at the beginning of the monitoring periods 604b and may sleep during the monitoring periods 604a assigned to the UE A.

By configuring a UE to perform DL channel monitoring at a subset of the monitoring periods 604 instead of at every monitoring period 604 between the TXOPs 302, the UE can reduce the amount of power used for monitoring and the BS may still have the flexibility to begin scheduling a UE at an earlier time (e.g., at a mini-slot 230 boundary instead of a slot 220 boundary) upon gaining an access to a TXOP 302. In addition, the BS may configure the UE to monitor at a granularity of a mini-slot 230 for a period of time and then switch to monitor at a slot level 220, as described in greater detail herein. For example, after the start of a TXOP 302, the BS may configure a UE to perform DL control channel monitoring at certain mini-slot 230 boundaries, certain half-slot boundaries, and/or certain slot 220 boundaries within the TXOP 302.

While the scheme 600 illustrates the monitoring periods 604 divided into two subsets of interleaving monitoring periods 604 for two UEs, the scheme 600 can be alternatively configured to divide the monitoring periods 604 into any suitable number of subsets of interleaving monitoring periods 604, for example, depending on the number of UEs (e.g., about 3, 4, or 5 or more) expected to be scheduled in the next TXOP 302.

FIG. 7 illustrates a DL control channel monitoring configuration scheme 700 according to some embodiments of the present disclosure. The scheme 700 may be employed by BSs (e.g., the BSs 105 and 500) and UEs (e.g., the UEs 115 and 400) in a network (e.g., the network 100). The scheme 700 is substantially similar to scheme 600. However, in the scheme 700, a BS may configure different UEs with different groups of consecutive monitoring periods 604 outside of a TXOP 302. For example, the BS may configure a UE A with a subset of consecutive monitoring periods 604a and may configure a UE B with a subset of consecutive monitoring periods 604b.

Similar to the scheme 600, the scheme 700 may reduce UE power consumption and may provide the BS with the flexibility of selecting a schedule starting time at a mini-slot 230 boundary. The grouping of consecutive monitoring periods 604 can allow a UE to have a longer sleep time before waking up to monitor for a schedule from the BS. Thus, the scheme 700 can further reduce UE power consumptions. In addition, the BS may configure the UEs to switch to a different subset of consecutive monitoring periods 604 or switch to a slot-level monitoring after a period of time. While the scheme 700 illustrates groupings of two consecutive monitoring periods 604 in each subset, the scheme 700 can be alternatively configured to include groups of any number of consecutive monitoring periods 604 in a subset, for example, depending on the number of monitoring periods 604 in a slot 220 and/or a number of UEs expected to be scheduled in a next TXOP 302.

Figure 8:
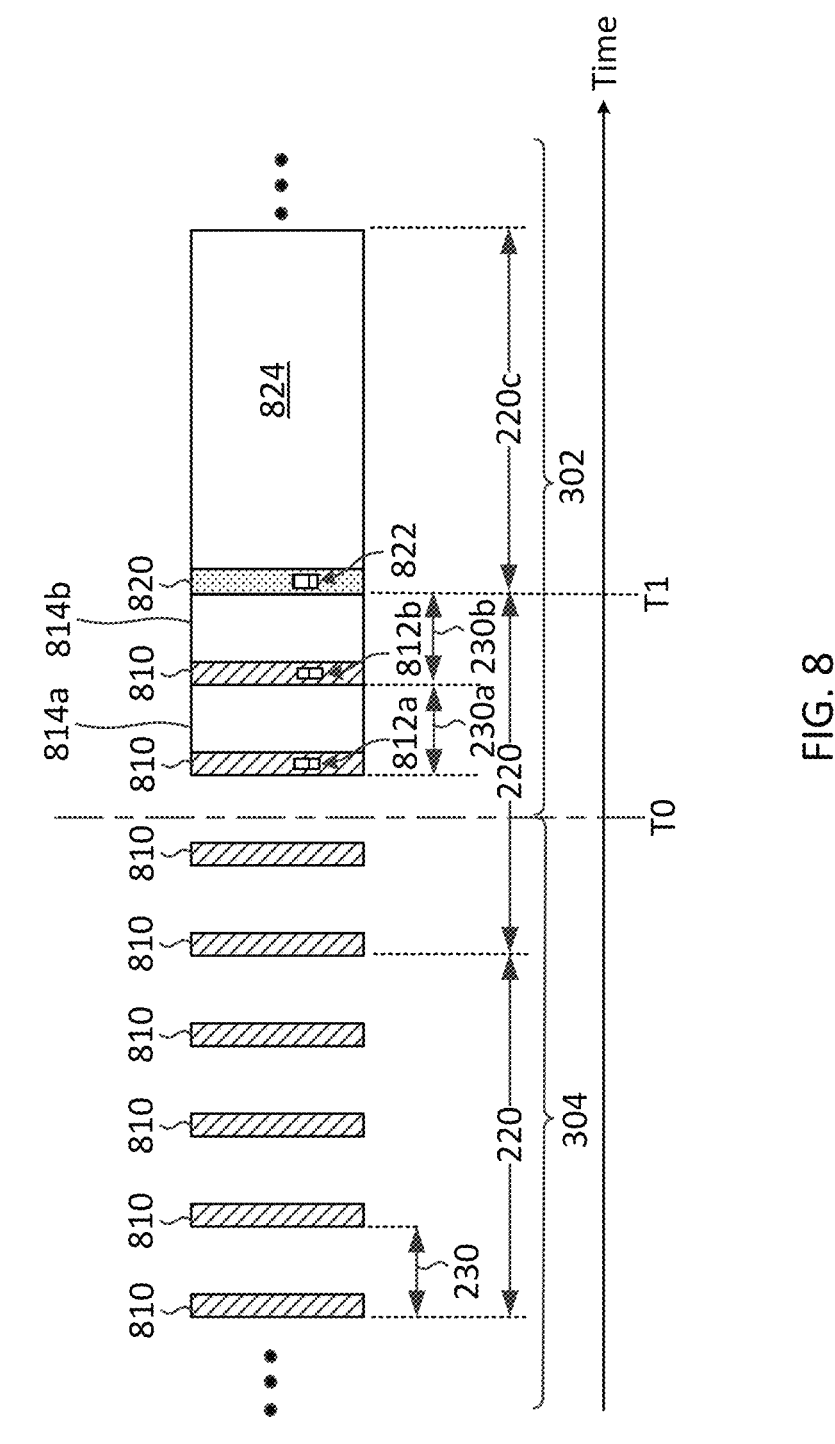
FIG. 8 illustrates a DL control channel monitoring configuration and scheduling scheme according to some embodiments of the present disclosure.

FIG. 8 illustrates a DL control channel monitoring configuration and scheduling scheme 800 according to some embodiments of the present disclosure. The scheme 700 may be employed by BSs (e.g., the BSs 105 and 500) and UEs (e.g., the UEs 115 and 400) in a network (e.g., the network 100). In the scheme 800, a BS may configure a UE to perform DL control channel monitoring 810 at a granularity of a mini-slot 230. Upon gaining an access to a TXOP 302, for example, at a time T0, the BS may schedule the UE for communications in mini-slots 230. For example, the BS may transmit a scheduling grant 812a (e.g., the scheduling grant 312) in a DL control channel region (e.g., the DL control channel region 314) of a mini-slot 230a within the TXOP 302. The scheduling grant 812a may schedule the UE for a communication 814a in the mini-slot 230a. Similarly, the BS may transmit a scheduling grant 812b in a DL control channel region of a mini-slot 230b within the TXOP 302. The scheduling grant 812b may schedule the UE for a communication 814b in the mini-slot 230b. Subsequently, the BS may configure the UE to switch to perform DL control channel monitoring 820 at a granularity of a slot 220. For example, the BS may transmit a scheduling grant 822 in a DL control channel region of a slot 220c subsequent to the mini-slot 230b. The scheduling grant 822 may schedule the UE for a communication 824 in the slot 220c.

In some embodiments, the communication 824 can be a DL communication. The BS may require a certain amount of processing time to generate a TB for the DL communication 824. By scheduling the communications 814a and 814b at the granularity of a mini-slot 230 at the beginning of the TXOP 302, the BS may have a sufficient amount of processing time to prepare or generate the TB for the DL communication 824 after passing the LBT for the TXOP 302.

In some embodiments, the BS may pass the LBT for a TXOP 302 just before a slot 220 boundary. The BS may schedule the UE for a communication at a granularity of a slot 220 at the beginning of the TXOP 302 by generating a TB with a TB size based on resources in slot 220 and applying puncturing In some embodiments, the BS may configure the UE to perform DL control channel monitoring based on a first subcarrier spacing outside of a TXOP 302 and until the first slot boundary (e.g., at T1) after the start of the TXOP 302. The control channel and data till the beginning of the first slot boundary after the start of the TXOP (e.g., during the mini-slots 230a and 230b) can be communicated based on the first subcarrier spacing. The control channel and data within the TXOP 302 after the first slot boundary (e.g., during the slot 220c and subsequent to the slot 220c) can be communicated based on a second subcarrier spacing. The first subcarrier spacing can be larger than the second subcarrier spacing. For example, the first subcarrier spacing can be about 60 kHz, whereas the second subcarrier spacing can be about 15 kHz. The scheduling grants 812 and 822 can be communicated based on the first subcarrier spacing. The monitoring at the larger subcarrier spacing can increase the power consumption at a UE.

Figure 9:
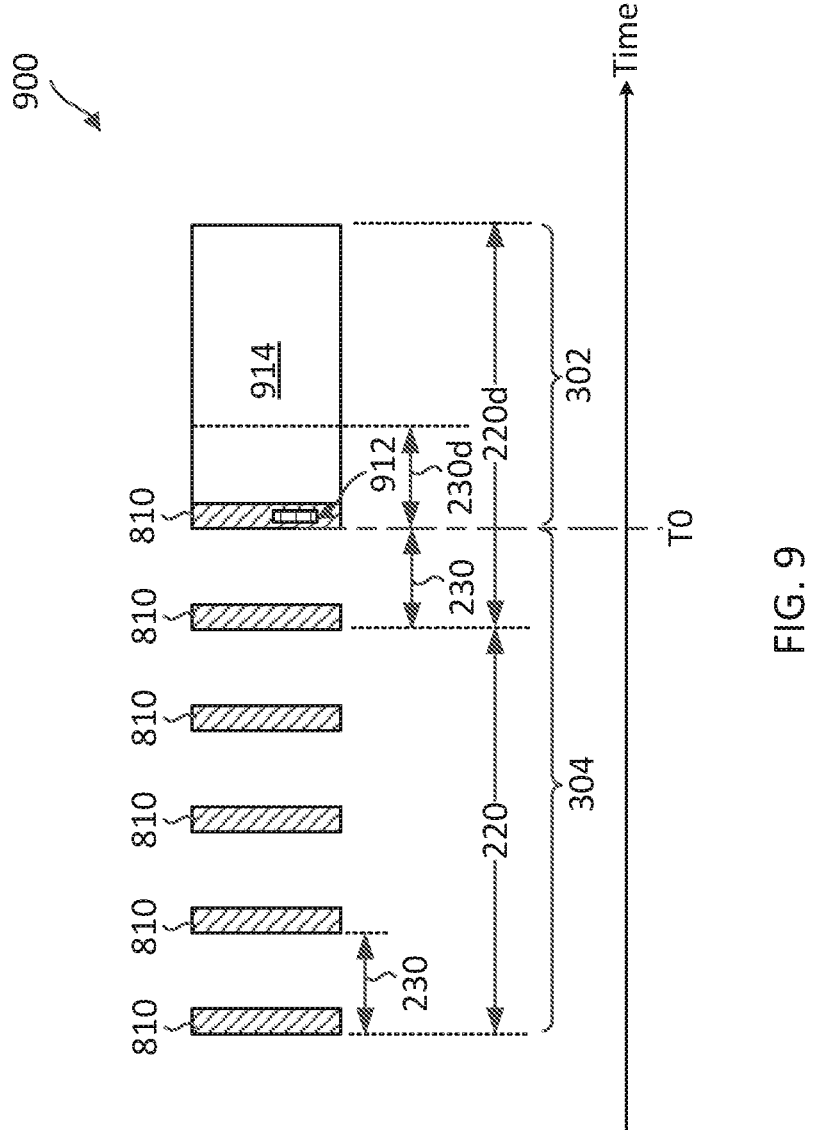
FIG. 9 illustrates a DL control channel monitoring configuration and scheduling scheme according to some embodiments of the present disclosure.

FIG. 9 illustrates a DL control channel monitoring configuration and scheduling scheme 900 according to some embodiments of the present disclosure. The scheme 900 may be employed by BSs (e.g., the BSs 105 and 500) and UEs (e.g., the UEs 115 and 400) in a network (e.g., the network 100). Similar to the scheme 800, a BS may configure a UE to perform mini-slot-level DL control channel monitoring 810. However, the BS may schedule a transmission longer than a mini-slot 230 to reduce scheduling and monitoring overheads. As shown, upon gaining an access to a TXOP 302, for example, at time T0, the BS may transmit a scheduling grant 912 in a DL control channel region (e.g., the DL control channel region 314) of a mini-slot 230d within a slot 220d in the TXOP 302. The scheduling grant 912 may schedule the UE for a communication 914 in remaining time or symbols (e.g., the symbols 240) of the slot 220d. The scheduling grant 912 can indicate a starting symbol and/or an ending symbol for the communication 914. For example, the scheduling grant 912 may include a time domain resource allocation (TDRA) field for indicating the starting and/or ending symbols for the communication 914. In some instances, the TDRA field may provide about 16 options for configuring various combinations of starting and/or ending symbols for scheduling a communication in a period longer than a mini-slot 230. The communication 914 may include a TB. The TB may be generated by rate-matching encoded data bits (e.g., an encoded network layer data packet) to the number of remaining symbols in the slot 220d. Alternatively, the communication 914 may include repetitions of a TB with a smaller TB size, for example, rate-match for a mini-slot 230.

Figures 10A, 10B:
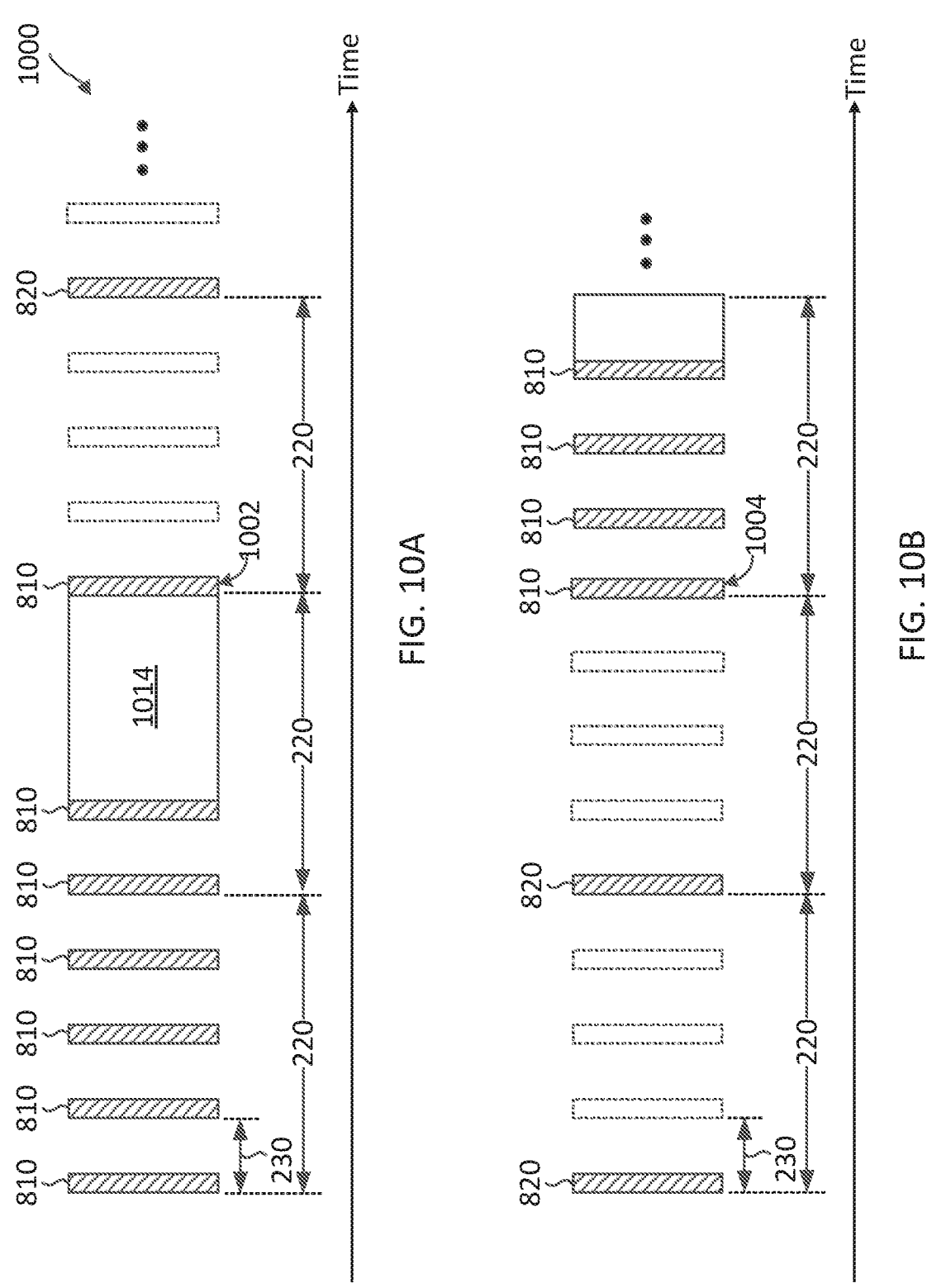
FIG. 10A illustrates a DL control channel monitoring configuration that switches from a low-latency monitoring mode to a normal monitoring mode according to embodiments of the present disclosure.
FIG. 10B illustrates a DL control channel monitoring configuration that switches from a normal monitoring mode to a low-latency monitoring mode according to embodiments of the present disclosure.

FIGS. 10A and 10B collectively illustrate a DL control channel monitoring configuration scheme 1000 that switches between a low-latency monitoring mode and a normal monitoring mode. The scheme 1000 may be employed by BSs (e.g., the BSs 105 and 500) and UEs (e.g., the UEs 115 and 400) in a network (e.g., the network 100). In the scheme 1000, a BS may configure a UE to switch between a low-latency monitoring mode and a normal monitoring mode for DL control channel monitoring in a shared channel. Accordingly, the BS may send an instruction to instruct a UE to modify or update a control channel monitoring period. The low-latency monitoring mode may include shorter monitoring periods (e.g., the monitoring periods 604) than the normal monitoring mode. For example, the low-latency monitoring mode may include monitoring periods corresponding to mini-slots 230, while normal monitoring mode may include monitoring periods corresponding to slots 220.

FIG. 10A illustrates a DL control channel monitoring configuration that switches from a low-latency monitoring mode to a normal monitoring mode according to embodiments of the present disclosure. As shown, the BS may configure the UE to switch from a mini-slot-level monitoring 810 to a slot-level monitoring 820 (shown by the trigger or switch 1002) at the end of a communication 1014 with the UE.

FIG. 10B illustrates a DL control channel monitoring configuration that switches from a normal monitoring mode to a low-latency monitoring mode according to embodiments of the present disclosure. As shown, the BS may configure the UE to switch from a slot-level monitoring 820 to a mini-slot-level monitoring 810 (shown by the trigger or switch 1004).

In some embodiments, the BS may trigger the UE to switch between the low-latency monitoring mode and the normal monitoring mode via layer 1 (L1) or physical layer signaling (e.g., in a DCI message separate from a scheduling grant). In some embodiments, the BS may include a trigger for the switch in a scheduling grant (e.g., the scheduling grants 312, 812, 822, and 912) for the UE, for example, in a last slot 220 of a TXOP 302 or a slot 220 towards the end of a TXOP 302.

In some embodiments, the BS may instruct the UE to switch from the low-latency monitoring mode to the normal monitoring mode when the UE has not received any scheduling grant (e.g., no active data) from the BS for a period of time. For example, the UE may start a timer after receiving a last scheduling grant (e.g., a UL grant or a DL grant) from the BS within the TXOP 302. The UE may perform DL control channel monitoring using a low-latency mode after the end of the TXOP 302. When the timer expires before the UE receives another scheduling grant from the BS, the UE may switch to the normal monitoring mode.

In some embodiments, when a UE receives a UL grant or a DL grant within a TXOP 302, the UE may perform mini-slot-level monitoring 810 after the end of the TXOP 302. However, the UE may switch to perform slot-level monitoring 820 when the UE has not received any scheduling grant from the BS after a certain amount of time.

In some embodiments, a BS may broadcast a message instructing all UEs in a network to perform DL control channel monitoring using a low-latency monitoring mode.

In some embodiments, when employing carrier aggregation, where the shared channel may be paired with a licensed anchor carrier, the BS may transmit the monitoring mode-switch instruction in the anchor carrier.

In some embodiments, the monitoring mode may be dependent on discontinuous reception (DRX) or paging. For example, a BS may not configure a UE in a DRX mode to perform monitoring in the low-latency monitoring mode.

Figure 11:
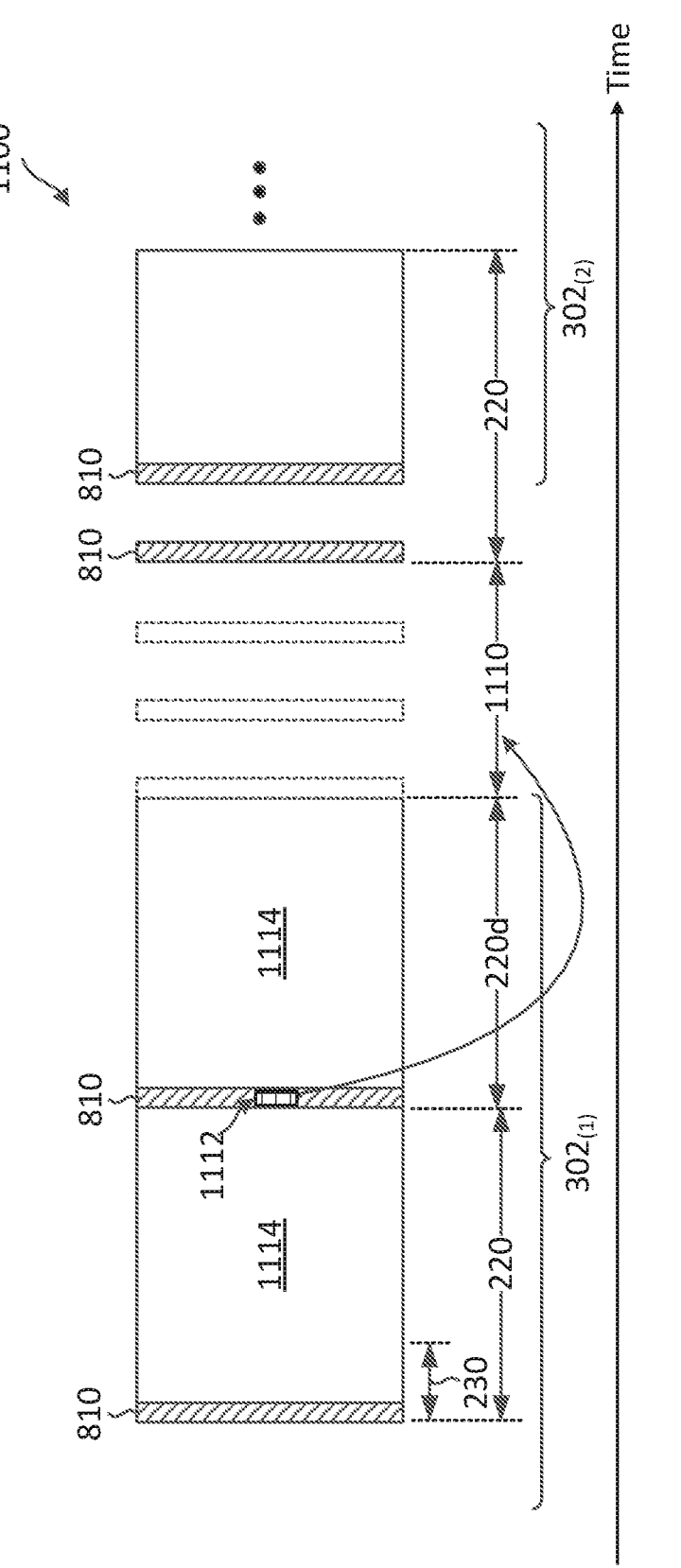
FIG. 11 illustrates a DL control channel monitoring configuration scheme according to some embodiments of the present disclosure.

FIG. 11 illustrates a DL control channel monitoring configuration scheme 1100 according to some embodiments of the present disclosure. The scheme 1100 may be employed by BSs (e.g., the BSs 105 and 500) and UEs (e.g., the UEs 115 and 400) in a network (e.g., the network 100). Similar to the schemes 800 and 900, a BS may configure a UE to perform mini-slot-level DL control channel monitoring 810 in a shared channel. However, the BS may instruct the UE to delay DL control channel monitoring for a time period at the end of a TXOP 302 when the BS may not use the shared channel. For example, the BS may backoff for a certain time period at the end of a TXOP $302_{(1)}$ before performing an LBT to again access to another TXOP $302_{(2)}$. The BS may configure the UE to skip DL control channel monitoring for a time period 1110 after the TXOP $302_{(1)}$, where the time period 1110 may include at least the backoff time period.

In some embodiments, the BS may include the DL control channel monitoring delay instruction in a scheduling grant 1112 (e.g., the scheduling grants 312, 812, 822, and 912) for a communication 1114 in last slot 220d of the TXOP $302_{(1)}$. The BS may further instruct the UE to perform mini-slot-level DL control channel monitoring (e.g., the monitoring 810) after the time period 1110 and switch to a slot-level DL control channel monitoring (e.g., the monitoring 820) after monitoring at the mini-slot level for a period of time. In some embodiments, the instruction may indicate the time period 1110 in units of slots 220. In some embodiments, when employing carrier aggregation, where the shared channel may be paired with a licensed anchor carrier, the BS may transmit the monitoring delay instruction in the anchor carrier.

Figure 12:
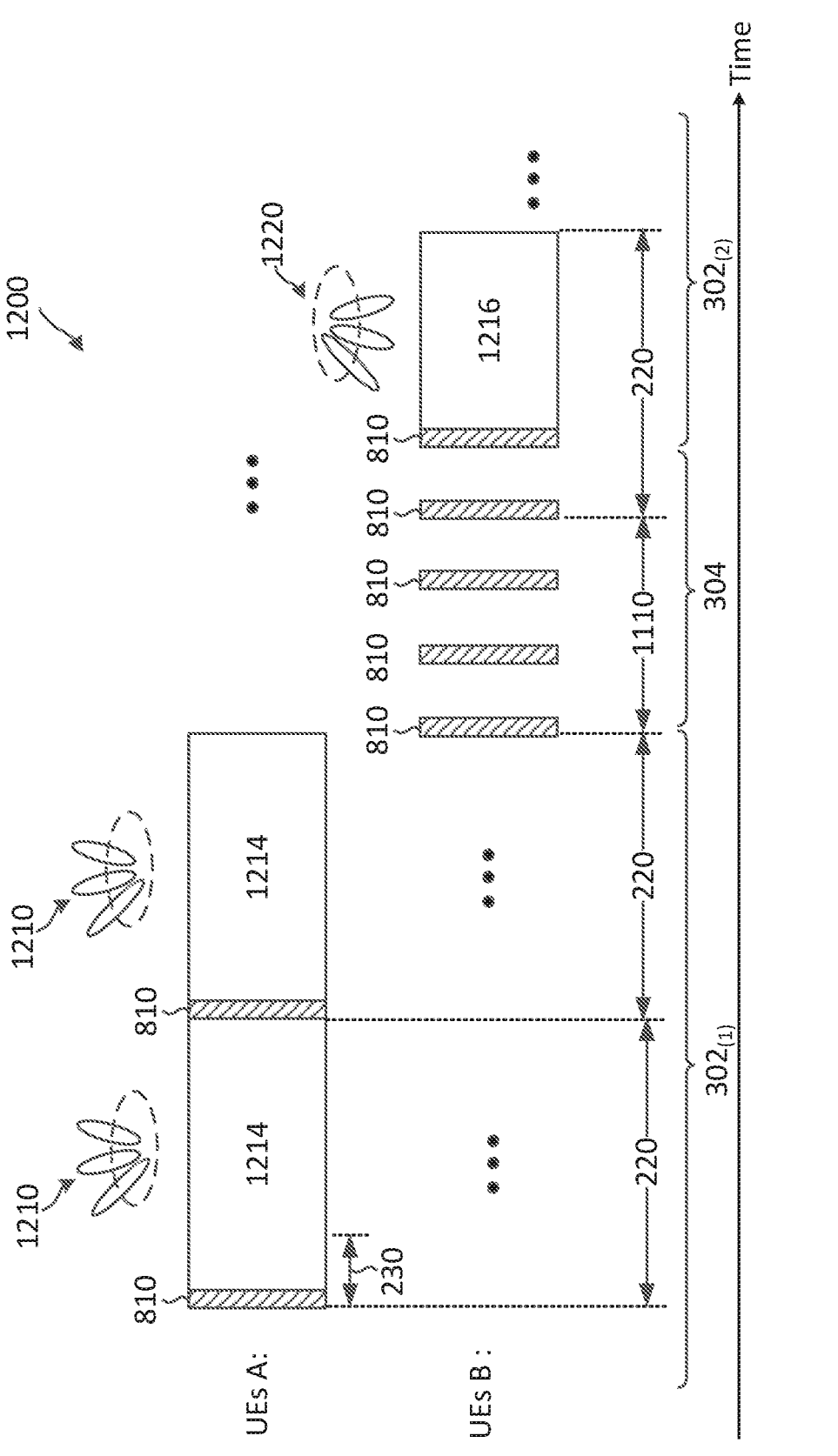
FIG. 12 illustrates a DL control channel monitoring configuration scheme according to some embodiments of the present disclosure.

FIG. 12 illustrates a DL control channel monitoring configuration scheme 1200 according to some embodiments of the present disclosure. The scheme 1200 may be employed by BSs (e.g., the BSs 105 and 500) and UEs (e.g., the UEs 115 and 400) in a network (e.g., the network 100). In the scheme 1200, a BS may instruct a UE to enable or disable DL control channel monitoring in a shared channel.

For example, the shared channel may be in a millimeter wave (mmWav) band. Thus, the BS may consider beam directions when determining the monitoring enable/disable instructions. For example, the BS may be in communications 1214 with a set of UEs A using a set of beam directions 1210 in a TXOP 302$_{(1)}$. The BS may determine a second set of potential UEs B for communications 1216 in a next TXOP 302$_{(2)}$, where the expected communications 1216 may require a different set of beam directions 1220. The BS can instruct the first set of UEs A to disable DL control channel monitoring after the end of the TXOP 302$_{(1)}$ and may instruct the second set of UEs B to enable DL control channel monitoring at the end of the TXOP 302$_{(2)}$. In some embodiments, the enable instruction may include a wakeup signal, whereas the disable instruction may include a sleep signal.

In some embodiments, an enable/disable instruction can instruct a UE to enable/disable DL control channel monitoring in the beam directions 1210 or 1220. For example, the instruction can include beam specific information, such as beam indices representing the beam directions 1210 or 1220. In some embodiments, the instruction may be a common sleep signal or disable instruction for a set of UEs without including beam specific information.

In some embodiments, the BS may broadcast the disable instruction to all UEs in the network and the UEs that do not have a current scheduling grant (e.g., the scheduling grants 312, 812, 822, 912, and 1112) from the BS may disable DL control channel monitoring.

In some embodiments, when employing carrier aggregation, where the shared channel may be paired with a licensed anchor carrier, the BS may transmit the enable/disable instruction (e.g., in a DCI message) in the anchor carrier.

In some embodiments, a BS (e.g., the BSs 105) and a UE (e.g., the UEs 115) may employ any combinations of the schemes 600, 700, 800, 900, 1000, 1100, and 1200 described above with respect to FIGS. 6, 7, 8, 9, 10A-10B, 11, and 12, respectively, to balance between UE power consumptions for DL control channel monitoring and BS scheduling flexibility or medium utilization efficiency.

Figure 13:
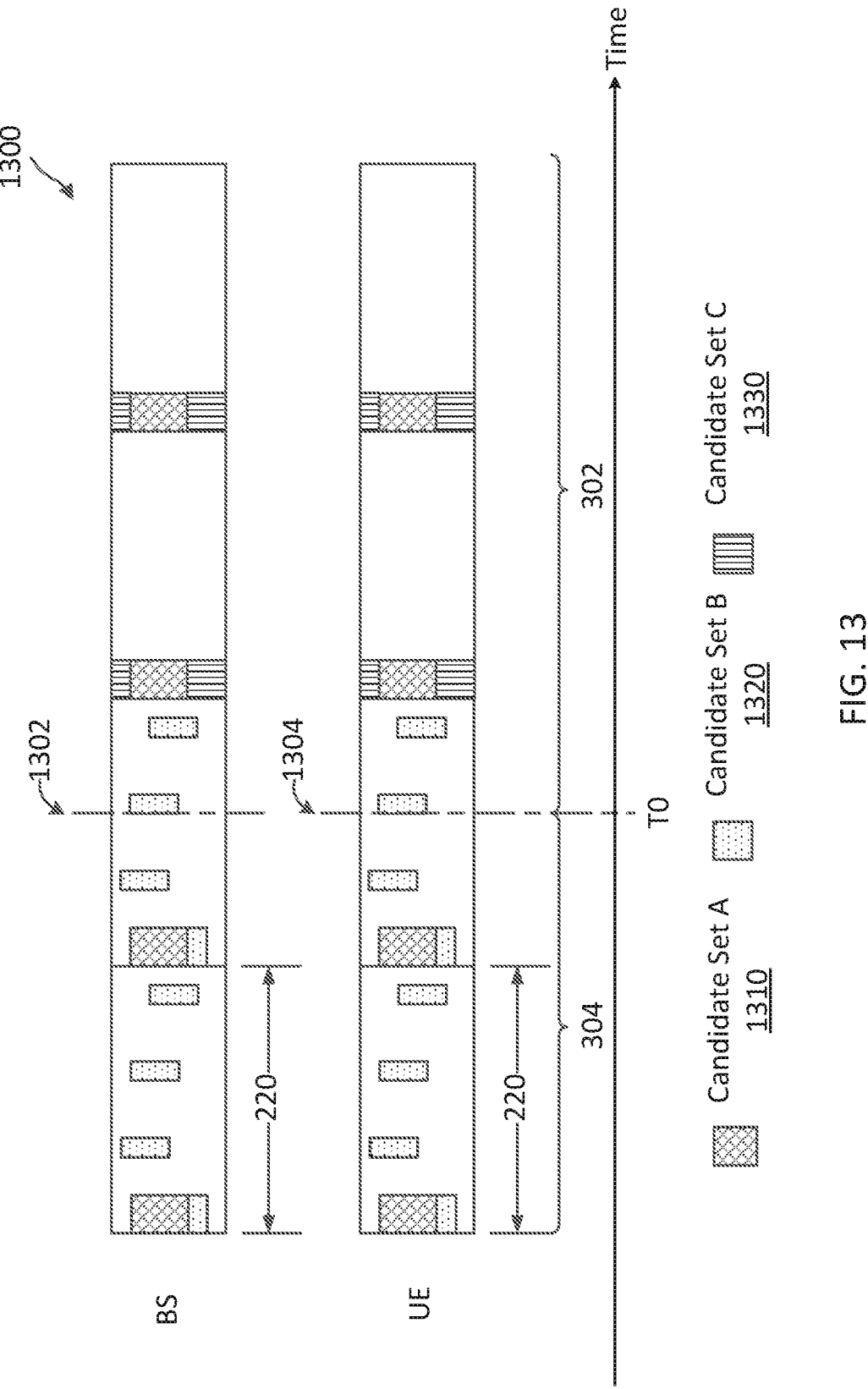
FIG. 13 illustrates a DL control channel resource configuration scenario according to some embodiments of the present disclosure.
Figure 14:
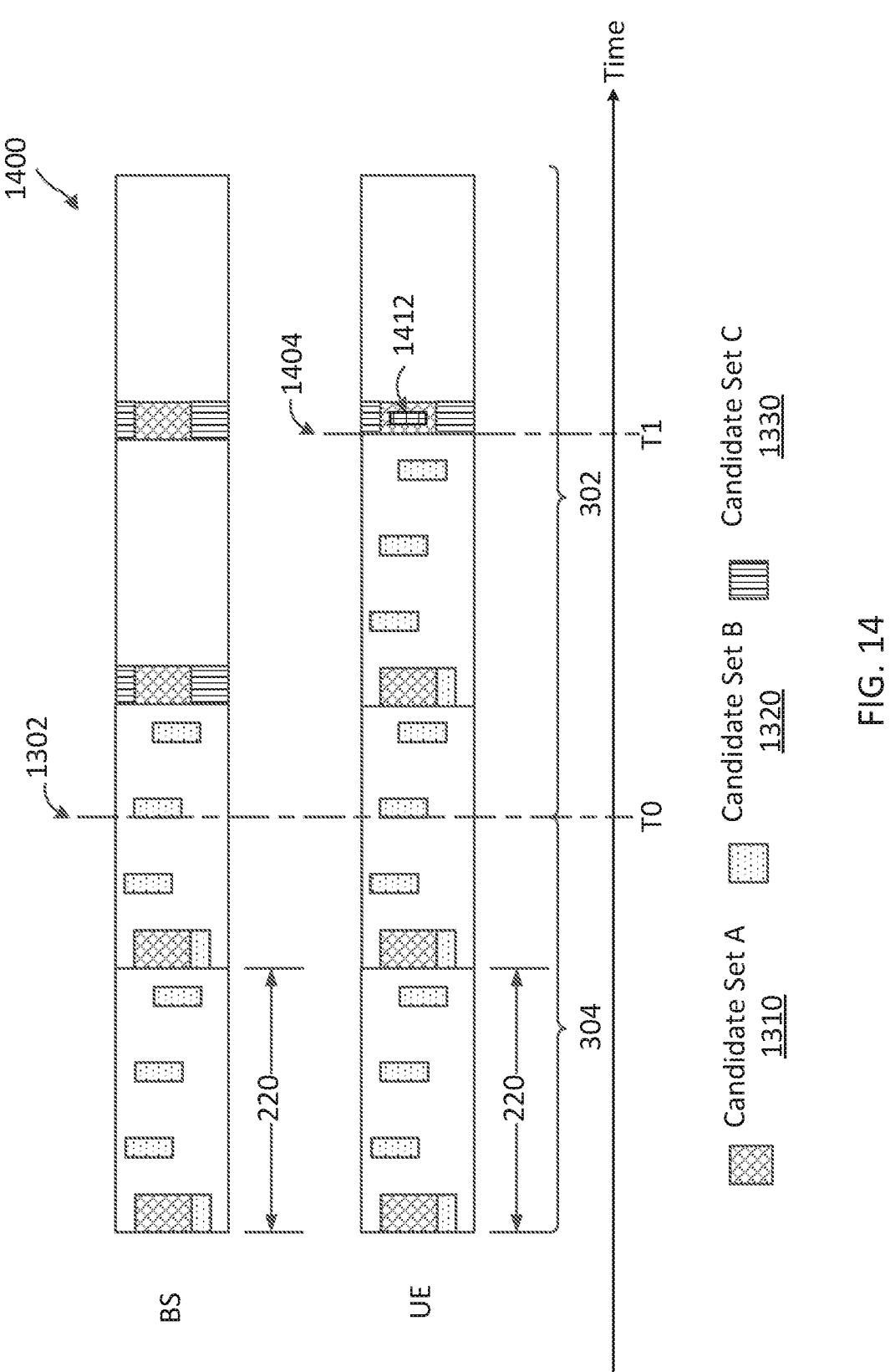
FIG. 14 illustrates a DL control channel resource configuration scenario according to some embodiments of the present disclosure.

In an embodiment, a BS (e.g., the BS 105) may configure different DL control channel monitoring occasions for DL control channel monitoring outside of a TXOP or LBT-gap time (e.g., the period 304) or within a TXOP (e.g., the TXOPs 302) in a shared channel. The control channel monitoring occasions can include search spaces where a scheduling grant may be transmitted. A search space may include a CORSET including resources (e.g. resource blocks or resource elements) at various aggregation levels within the search space. The BS may transmit a scheduling grant using resources corresponding to a candidate (e.g., resources at a particular aggregation level) in the CORSET. Since LBTs are performed by the BS, a UE may or may not be able to detect the start of a TXOP. For example, upon a successful LBT and getting a TXOP in the shared channel, the BS may transmit a preamble, a reservation signal, a wideband demodulation reference signal (DMRS), or any suitable indication signal indicating the start the TXOP. Under a normal operational mode, the UE may detect the indication signal indicating the start of the TXOP and perform DL control channel monitoring accordingly, for example, switching to a search space for monitoring within a TXOP. However, in some instances, the UE may miss the indication signal, and thus may not switch to monitor in the search space configured for monitoring within a TXOP. The BS may configure the CORSETs or search space such that a UE that misses the detection of a start of a TXOP may be able to detect the presence of the TXOP and switch to the search space for monitoring within a TXOP. FIGS. 13 and 14 illustrate different scenarios for the search space monitoring. In FIGS. 13 and 14, the x-axes represent time in some constant units.

FIG. 13 illustrates a DL control channel resource configuration scenario 1300 according to some embodiments of the present disclosure. The scenario 1300 may correspond to a search space configuration and monitoring scenario in the network 100. The BS may configure different search spaces for DL control channel monitoring outside of a TXOP 302 and within a TXOP 302, but the different search spaces can be partially overlapping. For example, the BS may configure a search space including a candidate set A 1310 and a candidate set B 1320 for DL control channel monitoring outside of a TXOP 302 (e.g., the period 304). The BS may configure another search space including the candidate set A 1310 and a candidate set C 1330. The candidate set A 1310 and the candidate set C 1330 may be located at the beginning of a slot 220. The candidate set A 1310 and the candidate set C 1230 may be located at the beginning of a mini-slot 230.

For example, a UE may monitor for a TXOP start indication signal or a schedule from the BS in the candidate set A 1310 and the candidate set B 1320 outside of a TXOP 302. The BS may pass an LBT at a time T0 (shown by the arrow 1302). The UE may detect the start of the TXOP 302 (shown by the arrow 1304). Upon detecting the start of the TXOP 302, the UE may switch to monitor in the candidate set A 1310 and the candidate set C 1330 within the TXOP 302.

FIG. 14 illustrates a DL control channel resource configuration scenario 1400 according to some embodiments of the present disclosure. The scenario 1400 may correspond to a search space configuration and monitoring scenario in the network 100. The scenario 1400 is illustrated using the same search space configuration, but illustrate a UE that misses the indication of the start of the TXOP 302. In the scenario 1400, the UE misses the detection of the start of the TXOP 302 when the BS passes the LBT. Thus, the UE may continue to monitor in the candidate set A 1310 and the candidate set B 1320 instead of switching to monitor in the candidate set A 1310 and the candidate set C 1330. At time T1, the BS may transmit a scheduling grant 1412 (e.g., the scheduling grants 312, 812, 822, 912, and 1112) in the candidate set A. The UE may detect the presence of the TXOP 302 based on the monitoring in the candidate set A 1310 (shown by the arrow 1404). Thus, the UE may switch to monitor in the candidate set A 1310 and the candidate set C 1330 after time T1. In some embodiments, the BS may configure the common candidate set A 1310 with a higher priority than the candidate set C 1330 for carrying a scheduling grant to improve UE detection robustness.

In some embodiments, the BS may transmit a DL control resource configuration including slot offsets, mini-slot offsets, and/or symbol offsets where the candidate set A 1310, the candidate set B 1320, and the candidate set C are located. The slot boundary, the mini-slot boundary, and the symbol boundaries may be defined with respect to an absolute system time, for example, the end of a TXOP 302 or the beginning of a TXOP 302. In some embodiments, the BS may indicate the search spaces or the candidate set A 1310, the candidate set B 1320, and the candidate set C 1330 using absolute time. In some embodiments, the BS may indicate the search spaces or the candidate set A 1310, the candidate set B 1320, and the candidate set C 1330 using relative time, for example, with respect to the start of a TXOP 302, without including LBT-gap time (e.g., the time periods 304).

In some embodiments, the BS may configure search spaces at a mini-slot level for monitoring outside of a TXOP 302. In some embodiments, the BS may configure search spaces at a slot level for monitoring within a TXOP 302. In some embodiments, the BS may configure search spaces at a mini-slot-level monitoring (e.g., the monitoring 810) for a number of slots 220 at the beginning of a TXOP 302 and then switches to a slot-level monitoring (e.g., the monitoring 820) for the remaining slots 220 in the TXOP 302.

In some embodiments, the BS may configure the search spaces based on the decoding capability of the UE. For example, the UE may be capable of decoding about 44 candidates with a subcarrier spacing of about 15 kHz in the duration of a slot 220. Thus, the BS may configure the search spaces such that the candidate set A 1310 and the candidate set B 1320 may include a total of about 44 or less candidates and the candidate set A 1310 and the candidate set C 1330 may include a total of about 44 or less candidates. In some embodiments, the BS may further determine the number of candidates by considering the subcarrier spacing. The control resource configuration mechanisms shown in the scenarios 1300 and 1400 can be used in conjunction with any combinations of the schemes 600, 700, 800, 900, 1000, 1100, 1200 described above with respect to FIGS. 6, 7, 8, 9, 10A-10B, 11, and 12, respectively.

Figure 15:
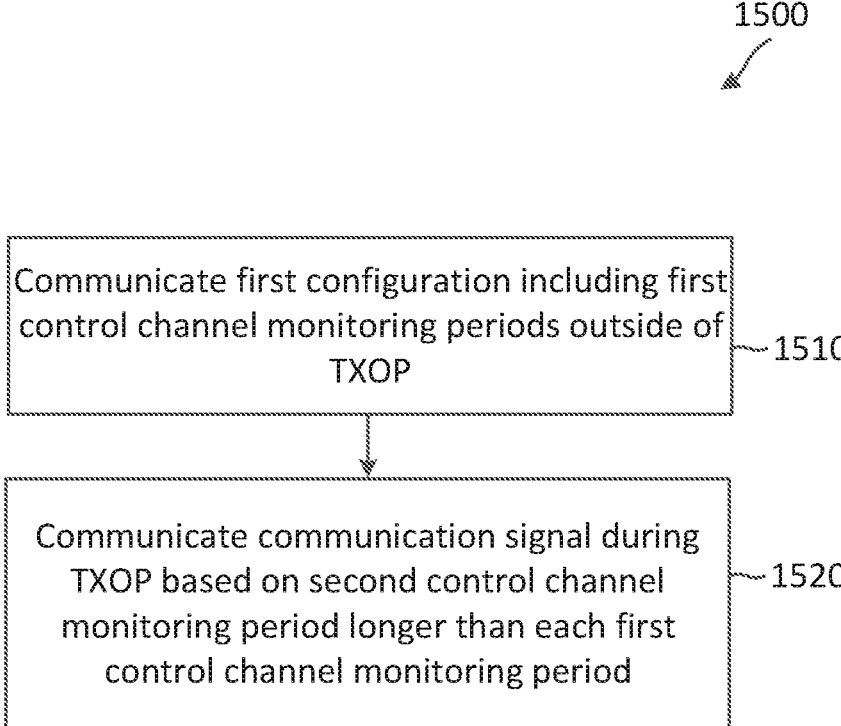
FIG. 15 is a flow diagram of a communication method according to embodiments of the present disclosure.

FIG. 15 is a flow diagram of a communication method 1500 according to embodiments of the present disclosure. Steps of the method 1500 can be executed by a computing device (e.g., a processor, processing circuit, and/or other suitable component) of a wireless communication device or other suitable means for performing the steps. For example, a wireless communication device, such as the BS 105 or the BS 500, may utilize one or more components, such as the processor 502, the memory 504, the DL control channel processing module 508, the transceiver 510, the modem 512, and the one or more antennas 516, to execute the steps of method 1500. In another example, a wireless communication device, such as the UE 115 or the UE 400, may utilize one or more components, such as the processor 402, the memory 404, the DL control channel processing module 408, the transceiver 410, the modem 412, and the one or more antennas 416, to execute the steps of method 1500. The method 1500 may employ similar mechanisms as in the 600, 700, 800, 900, 1000, 1100, and 1200 and/or the scenarios 1300 and 1400 described above with respect to FIGS. 6, 7, 8, 9, 10A-10B, 11, 12, 13, and 14, respectively. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the method 1500 includes communicating, by a first wireless communication device with a second wireless communication device, a first configuration including a set of first control channel monitoring periods (e.g., at a granularity of a mini-slot 230) outside of a TXOP (e.g., in a LBT-gap period 304).

At step 1520, the method 1500 includes communicating, by the first wireless communication device with the second wireless communication device, a communication signal during the TXOP based on a second control channel monitoring period (e.g., at a granularity of a slot 220) longer than each of the first control channel monitoring periods.

In an embodiment, the first wireless communication device may correspond to a BS and the second wireless communication device may correspond to a UE. In such an embodiment, the first wireless communication device may transmit the first configuration to the second wireless communication device. In another embodiment, the first wireless communication device may correspond to a UE and the second wireless communication device may correspond to a BS. In such an embodiment, the first wireless communication device may receive the first configuration from the second wireless communication device.

In some embodiments, the set of first control channel monitoring periods may interleave with another set of first control channel monitoring periods in time, where the another set of first control channel monitoring periods are assigned to a third wireless communication device different from the first wireless communication device and the second wireless communication device as shown in the scheme 600.

In some embodiments, the set of first control channel monitoring periods may be contiguous in time and adjacent to another set of first control channel monitoring periods contiguous in time, where the other set of first control channel monitoring periods are assigned to a third wireless communication device different from the first wireless communication device and the second wireless communication device as shown in the scheme 700.

In some embodiments, the first wireless communication device may communicate with the second wireless communication device, a second configuration including a third control channel monitoring period outside of the TXOP. The third control channel monitoring period may be longer (e.g., at a granularity of a slot 220) than each of the first control channel monitoring periods. The second configuration can be communicated via L1 signaling or a scheduling grant (e.g., the scheduling grants 312, 812, 822, 912, and 1112, and 1412).

In some embodiments, when the first wireless communication device is a UE, the first wireless communication device may monitor a control channel for a scheduling grant from the second wireless communication device based on the set of first control channel monitoring periods. When the first wireless communication device determines that no scheduling grant has been received from the second wireless communication device for a time period, the first wireless communication device may switch to monitor the control channel based on a third control channel monitoring period that is longer (e.g., at a granularity of a slot 220) than each of the first control channel periods.

In some embodiments, the first wireless communication device may communicate with the second wireless communication device during a third control channel monitoring period within another TXOP, a scheduling grant for a first transmission time interval (TTI), where the third control channel monitoring period is associated with scheduling of a second TTI shorter than the first TTI as shown in the scheme 900. The first wireless communication device may communicate, with the second wireless communication device, a communication signal during the first TTI based on the scheduling grant.

In some embodiments, the first wireless communication device may communicate, with the second wireless communication device, an instruction to enable or disable control channel monitoring. In some embodiments, the TXOP may be in a first frequency band (e.g., a shared channel) and the instruction may be communicated in a second frequency band (e.g., a licensed anchor carrier) different from the first frequency band.

In some embodiments, the first wireless communication device may communicate, with the second wireless communication device, the instruction to disable the control channel monitoring for a time period (e.g., the time period 1110) between the TXOP (e.g., the TXOP $302_{(1)}$) and a next TXOP (e.g., the TXOP $302_{(2)}$) as shown in the scheme 1100. The time period may be associated with an LBT backoff period for the next TXOP.

In some embodiments, the first wireless communication device may communicate, with the second wireless communication device, the instruction to enable the control channel monitoring. The instruction may be based on an expected beam direction (e.g., the beam directions 1210 and 1220) associated with the TXOP, the first wireless communication device, and the second wireless communication device as shown in the scheme 1200. The communication signal may be communicated based on the expected beam direction.

In some embodiments, when the first wireless communication device is a BS, the first wireless communication device may transmit the instruction instructing the second wireless communication device to disable the control channel monitoring. The instruction may be based on an expected beam direction associated with an expected communication between the first wireless communication device and a third wireless communication device in another TXOP. The second wireless communication device may be different from the third wireless communication device.

In some embodiments, when the first wireless communication device is a UE, the first wireless communication device may receive the instruction to disable the control channel monitoring from the second wireless communication device. The instruction may be based on an expected beam direction associated with an expected communication between the second wireless communication device and a third wireless communication device in another TXOP. The first wireless communication device may be different from the third wireless communication device.

Figure 16:
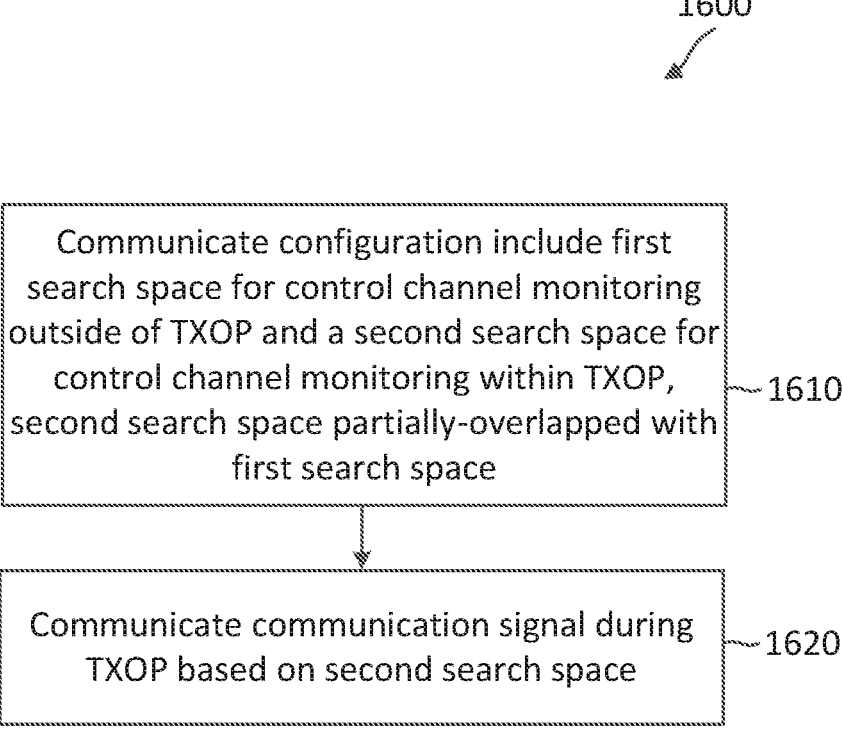
FIG. 16 is a flow diagram of a communication method according to embodiments of the present disclosure.

FIG. 16 is a flow diagram of a communication method 1600 according to embodiments of the present disclosure. Steps of the method 1600 can be executed by a computing device (e.g., a processor, processing circuit, and/or other suitable component) of a wireless communication device or other suitable means for performing the steps. For example, a wireless communication device, such as the BS 105 or the BS 500, may utilize one or more components, such as the processor 502, the memory 504, the DL control channel processing module 508, the transceiver 510, the modem 512, and the one or more antennas 516, to execute the steps of method 1600. In another example, a wireless communication device, such as the UE 115 or the UE 400, may utilize one or more components, such as the processor 402, the memory 404, the DL control channel processing module 408, the transceiver 410, the modem 412, and the one or more antennas 416, to execute the steps of method 1600. The method 1600 may employ similar mechanisms as in the 600, 700, 800, 900, 1000, 1100, and 1200 and/or the scenarios 1300 and 1400 described above with respect to FIGS. 6, 7, 8, 9, 10A-10B, 11, 12, 13, and 14, respectively. As illustrated, the method 1500 includes a number of enumerated steps, but embodiments of the method 1600 may include additional steps before, after, and in between the enumerated steps. In some embodiments, one or more of the enumerated steps may be omitted or performed in a different order.

At step 1610, the method 1600 includes communicating, by a first wireless communication device with a second wireless communication device, a configuration including a first search space for a control channel monitoring outside of a TXOP (e.g., the TXOP 302) and a second search space for a control channel monitoring within the TXOP. The second search space is partially-overlapped with the first search space. For example, the first search space may include the candidate set A 1310 and the candidate set B 1320 and the second search space may include the candidate set A 1310 and the candidate set C 1330.

At step 1620, the method 1600 includes communicating, by the first wireless communication device with the second wireless communication device, a communication signal during the TXOP based on a second search space.

In an embodiment, the first wireless communication device may correspond to a BS and the second wireless communication device may correspond to a UE. In such an embodiment, the first wireless communication device may transmit the configuration to the second wireless communication device. In another embodiment, the first wireless communication device may correspond to a UE and the second wireless communication device may correspond to a BS. In such an embodiment, the first wireless communication device may receive the configuration from the second wireless communication device.

In some embodiments, when the first wireless communication device is a UE, the first wireless communication device may monitor a control channel in a time period outside of the TXOP based on the first search space. The first wireless communication device may detect a beginning of the TXOP. The first wireless communication device may monitor the control channel based on the second search space during the TXOP based on the detecting. In some embodiments, the first wireless communication device may monitor a control channel in a time period outside of the TXOP and at least a beginning portion of the TXOP based on the first search space. The first wireless communication device may determine that the TXOP has started based on the monitoring of a portion (e.g., the candidate set A 1310) of the first search space overlapping with the second search space. The first wireless communication device may monitor the control channel based on the second search space in a portion of the TXOP after the determining. In some embodiments, the first wireless communication device may transmit a scheduling grant (e.g., the scheduling grants 312, 812, 822, 912, 1112, and 1412) for the second wireless communication device in the second search space during the TXOP, where the communication signal may be communicated based on the scheduling grant.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising communicating, by a first wireless communication device with a second wireless communication device, a first configuration including a set of first control channel monitoring periods outside of a transmission opportunity (TXOP); and communicating, by the first wireless communication device with the second wireless communication device, a communication signal during the TXOP based on a second control channel monitoring period longer than each of the first control channel monitoring periods.

In some embodiments, wherein the set of first control channel monitoring periods are contiguous in time and adjacent to another set of first control channel monitoring periods contiguous in time, and wherein the another set of first control channel monitoring periods are assigned to a third wireless communication device different from the first wireless communication device and the second wireless communication device. In some embodiments, wherein the set of first control channel monitoring periods interleaves with another set of first control channel monitoring periods in time, and wherein the another set of first control channel monitoring periods are assigned to a third wireless communication device different from the first wireless communication device and the second wireless communication device. In some embodiments, the method further comprises communicating, by the first wireless communication device with the second wireless communication device, a second configuration including a third control channel monitoring period outside of the TXOP, wherein the third control channel monitoring period is longer than each of the first control channel monitoring periods. In some embodiments, wherein the communicating the second configuration includes communicating, by the first wireless communication device with the second wireless communication device, at least one of a control channel message including the second configuration or a scheduling grant including the second configuration. In some embodiments, the method further comprises monitoring, by the first wireless communication device, a control channel for a scheduling grant from the second wireless communication device based on the set of first control channel monitoring periods; determining, by the first wireless communication device, that no scheduling grant has been received from the second wireless communication device for a time period; and switching, by the first wireless communication device in response to the determining, to monitor the control channel based on a third control channel monitoring period that is longer than each of the first control channel periods. In some embodiments, the method further comprises communicating, by the first wireless communication device with the second wireless communication device during a third control channel monitoring period of the set of first control channel monitoring periods, a scheduling grant for a first transmission time interval (TTI), the third control channel monitoring period located within another TXOP and associated with scheduling of a second TTI shorter than the first TTI; and communicating, by the first wireless communication device with the second wireless communication device, a communication signal during the first TTI based on the scheduling grant. In some embodiments, the method further comprises communicating, by the first wireless communication device with the second wireless communication device, an instruction to enable or disable control channel monitoring. In some embodiments, wherein the TXOP is in a first frequency band, and wherein the instruction is communicated in a second frequency band different from the first frequency band. In some embodiments, wherein the communicating the instruction includes communicating, by the first wireless communication device with the second wireless communication device, the instruction to disable the control channel monitoring for a time period between the TXOP and a next TXOP, and wherein the time period is associated with a listen-before-talk (LBT) backoff period for the next TXOP. In some embodiments, wherein the communicating the instruction includes communicating, by the first wireless communication device with the second wireless communication device, the instruction to enable the control channel monitoring, the instruction being based on an expected beam direction associated with the TXOP, the first wireless communication device, and the second wireless communication device, and wherein the communicating the communication signal is based on the expected beam direction. In some embodiments, wherein the communicating the instruction includes transmitting, by the first wireless communication device to the second wireless communication device, the instruction to disable the control channel monitoring, the instruction being based on an expected beam direction associated with an expected communication between the first wireless communication device and a third wireless communication device in another TXOP, and wherein the second wireless communication device is different from the third wireless communication device. In some embodiments, wherein the communicating the instruction includes receiving, by the first wireless communication device from the second wireless communication device, the instruction to disable the control channel monitoring, the instruction being based on an expected beam direction associated with an expected communication between the second wireless communication device and a third wireless communication device in another TXOP, first wireless communication device is different from the third wireless communication device. In some embodiments, wherein the first configuration further includes a first subcarrier spacing for control channel monitoring in the set of first control channel monitoring periods outside of the TXOP, and wherein the method further comprises communicating, by the first wireless communication device with the second wireless communication device, a scheduling grant within the TXOP for communicating the communication signal based on a second subcarrier spacing that is smaller than the first subcarrier spacing.

Further embodiments of the present disclosure include a method of wireless communication, comprising communicating, by a first wireless communication device with a second wireless communication device, a configuration including a first search space for a control channel monitoring outside of a transmission opportunity (TXOP) and a second search space for a control channel monitoring within the TXOP, the second search space being partially-overlapped with the first search space; and communicating, by the first wireless communication device with the second wireless communication device, a communication signal during the TXOP based on a second search space.

In some embodiments, the method further comprises monitoring, by the first wireless communication device, a control channel in a time period outside of the TXOP based on the first search space; detecting, by the first wireless communication device, a beginning of the TXOP; and monitoring, by the first wireless communication device, the control channel based on the second search space during the TXOP based on the detecting. In some embodiments, the method further comprises monitoring, by the first wireless communication device, a control channel in a time period outside of the TXOP and at least a beginning portion of the TXOP based on the first search space; determining, by the first wireless communication device, that the TXOP has started based on the monitoring of a portion of the first search space overlapping with the second search space; and monitoring, by the first wireless communication device, the control channel based on the second search space in a portion of the TXOP after the determining. In some embodiments, the method further comprises transmitting, by the first wireless communication device, a scheduling grant for the second wireless communication device in the second search space during the TXOP, wherein the communicating the communication signal is based on the scheduling grant.

Further embodiments of the present disclosure include an apparatus comprising a transceiver configured to communicate, with a second wireless communication device, a first configuration including a set of first control channel monitoring periods outside of a transmission opportunity (TXOP); and communicate, with the second wireless communication device, a communication signal during the TXOP based on a second control channel monitoring period longer than each of the first control channel monitoring periods.

In some embodiments, wherein the set of first control channel monitoring periods are contiguous in time and adjacent to another set of first control channel monitoring periods contiguous in time, and wherein the another set of first control channel monitoring periods are assigned to a third wireless communication device different from the apparatus and the second wireless communication device. In some embodiments, wherein the set of first control channel monitoring periods interleaves with another set of first control channel monitoring periods in time, and wherein the another set of first control channel monitoring periods are assigned to a third wireless communication device different from the apparatus and the second wireless communication device. In some embodiments, wherein the transceiver is further configured to communicate, with the second wireless communication device, a second configuration including a third control channel monitoring period outside of the TXOP, and wherein the third control channel monitoring period is longer than each of the first control channel monitoring periods. In some embodiments, wherein the transceiver is further configured to communicate the second configuration by communicating, with the second wireless communication device, at least one of a control channel message including the second configuration or a scheduling grant including the second configuration. In some embodiments, the apparatus further comprises a processor configured to monitor a control channel for a scheduling grant from the second wireless communication device based on the set of first control channel monitoring periods; determine that no scheduling grant has been received from the second wireless communication device for a time period; and switch, in response to the determining, to monitor the control channel based on a third control channel monitoring period that is longer than each of the first control channel periods. In some embodiments, wherein the transceiver is further configured to communicate, with the second wireless communication device during a third control channel monitoring period of the set of first control channel monitoring periods, a scheduling grant for a first transmission time interval (TTI), the third control channel monitoring period located within another TXOP and associated with scheduling of a second TTI shorter than the first TTI; and communicate, with the second wireless communication device, a communication signal during the first TTI based on the scheduling grant. In some embodiments, wherein the transceiver is further configured to communicate, with the second wireless communication device, an instruction to enable or disable control channel monitoring. In some embodiments, wherein the TXOP is in a first frequency band, and wherein the instruction is communicated in a second frequency band different from the first frequency band. In some embodiments, wherein the transceiver is further configured to communicate the instruction by communicating, with the second wireless communication device, the instruction to disable the control channel monitoring for a time period between the TXOP and a next TXOP, and wherein the time period is associated with a listen-before-talk (LBT) backoff period for the next TXOP. In some embodiments, wherein the transceiver is further configured to communicate the instruction by communicating, with the second wireless communication device, the instruction to enable the control channel monitoring, the instruction being based on an expected beam direction associated with the TXOP, the apparatus, and the second wireless communication device, and wherein the communication signal is communicated based on the expected beam direction. In some embodiments, wherein the transceiver is further configured to communicate the instruction by transmitting, to the second wireless communication device, the instruction to disable the control channel monitoring, the instruction being based on an expected beam direction associated with an expected communication between the apparatus and a third wireless communication device in another TXOP, and wherein the second wireless communication device is different from the third wireless communication device. In some embodiments, wherein the transceiver is further configured to communicate the instruction by receiving, from the second wireless communication device, the instruction to disable the control channel monitoring, the instruction being based on an expected beam direction associated with an expected communication between the second wireless communication device and a third wireless communication device in another TXOP, and wherein the apparatus is different from the third wireless communication device. In some embodiments, wherein the first configuration further includes a first subcarrier spacing for control channel monitoring in the set of first control channel monitoring periods outside of the TXOP, and wherein the transceiver is further configured to communicate, with the second wireless communication device, a scheduling grant within the TXOP for communicating the communication signal based on a second subcarrier spacing that is smaller than the first subcarrier spacing.

Further embodiments of the present disclosure include an apparatus comprising a transceiver configured to communicate, with a second wireless communication device, a configuration including a first search space for a control channel monitoring outside of a transmission opportunity (TXOP) and a second search space for a control channel monitoring within the TXOP, the second search space being partially-overlapped with the first search space; and communicate, with the second wireless communication device, a communication signal during the TXOP based on a second search space.

In some embodiments, the apparatus further comprises a processor configured to monitor a control channel in a time period outside of the TXOP based on the first search space; detect a beginning of the TXOP; and monitor the control channel based on the second search space during the TXOP based on the detecting. In some embodiments, the apparatus further comprises a processor configured to monitor a control channel in a time period outside of the TXOP and at least a beginning portion of the TXOP based on the first search space; determine that the TXOP has started based on the monitoring of a portion of the first search space overlapping with the second search space; and monitor the control channel based on the second search space in a portion of the TXOP after the determining. In some embodiments, wherein the transceiver is further configured to transmit a scheduling grant for the second wireless communication device in the second search space during the TXOP, and wherein the communication signal is communicated based on the scheduling grant.

Further embodiments of the present disclosure include a computer-readable medium having program code recorded thereon, the program code comprising code for causing a first wireless communication device to communicate, with a second wireless communication device, a first configuration including a set of first control channel monitoring periods outside of a transmission opportunity (TXOP); and code for causing the first wireless communication device to communicate, with the second wireless communication device, a communication signal during the TXOP based on a second control channel monitoring period longer than each of the first control channel monitoring periods.

In some embodiments, wherein the set of first control channel monitoring periods are contiguous in time and adjacent to another set of first control channel monitoring periods contiguous in time, and wherein the another set of first control channel monitoring periods are assigned to a third wireless communication device different from the first wireless communication device and the second wireless communication device. In some embodiments, wherein the set of first control channel monitoring periods interleaves with another set of first control channel monitoring periods in time, and wherein the another set of first control channel monitoring periods are assigned to a third wireless communication device different from the first wireless communication device and the second wireless communication device. In some embodiments, the computer-readable medium further comprises code for causing the first wireless communication device to communicate, with the second wireless communication device, a second configuration including a third control channel monitoring period outside of the TXOP, wherein the third control channel monitoring period is longer than each of the first control channel monitoring periods. In some embodiments, wherein the code for causing the first wireless communication device to communicate the second configuration is further configured to communicate, with the second wireless communication device, at least one of a control channel message including the second configuration or a scheduling grant including the second configuration. In some embodiments, the computer-readable medium further comprises code for causing the first wireless communication device to monitor a control channel for a scheduling grant from the second wireless communication device based on the set of first control channel monitoring periods; code for causing the first wireless communication device to determine that no scheduling grant has been received from the second wireless communication device for a time period; and code for causing the first wireless communication device to switch, in response to the determining, to monitor the control channel based on a third control channel monitoring period that is longer than each of the first control channel periods. In some embodiments, the computer-readable medium further comprises code for causing the first wireless communication device to communicate, with the second wireless communication device during a third control channel monitoring period of the set of first control channel monitoring periods, a scheduling grant for a first transmission time interval (TTI), the third control channel monitoring period located within another TXOP and associated with scheduling of a second TTI shorter than the first TTI; and code for causing the first wireless communication device to communicate, with the second wireless communication device, a communication signal during the first TTI based on the scheduling grant. In some embodiments, the computer-readable medium further comprises code for causing the first wireless communication device to communicate, with the second wireless communication device, an instruction to enable or disable control channel monitoring. In some embodiments, wherein the TXOP is in a first frequency band, and wherein the instruction is communicated in a second frequency band different from the first frequency band. In some embodiments, wherein the code for causing the first wireless communication device to communicate the instruction is further configured to communicate, with the second wireless communication device, the instruction to disable the control channel monitoring for a time period between the TXOP and a next TXOP, and wherein the time period is associated with a listen-before-talk (LBT) backoff period for the next TXOP. In some embodiments, wherein the code for causing the first wireless communication device to communicate the instruction is further configured to communicate, with the second wireless communication device, the instruction to enable the control channel monitoring, the instruction being based on an expected beam direction associated with the TXOP, the first wireless communication device, and the second wireless communication device, and wherein the communication signal is communicated based on the expected beam direction. In some embodiments, wherein the code for causing the first wireless communication device to communicate the instruction is further configured to transmit, to the second wireless communication device, the instruction to disable the control channel monitoring, the instruction being based on an expected beam direction associated with an expected communication between the first wireless communication device and a third wireless communication device in another TXOP, and wherein the second wireless communication device is different from the third wireless communication device. In some embodiments, wherein the code for causing the first wireless communication device to communicate the instruction is further configured to receive, from the second wireless communication device, the instruction to disable the control channel monitoring, the instruction being based on an expected beam direction associated with an expected communication between the second wireless communication device and a third wireless communication device in another TXOP, and wherein first wireless communication device is different from the third wireless communication device. In some embodiments, wherein the first configuration further includes a first subcarrier spacing for control channel monitoring in the set of first control channel monitoring periods outside of the TXOP, and wherein the computer-readable medium further comprises code for causing the first wireless communication device to communicate, with the second wireless communication device, a scheduling grant within the TXOP for communicating the communication signal based on a second subcarrier spacing that is smaller than the first subcarrier spacing.

Further embodiments of the present disclosure include a computer-readable medium having program code recorded thereon, the program code comprising code for causing a first wireless communication device to communicate, with a second wireless communication device, a configuration including a first search space for a control channel monitoring outside of a transmission opportunity (TXOP) and a second search space for a control channel monitoring within the TXOP, the second search space being partially-overlapped with the first search space; and code for causing the first wireless communication device to communicate, with the second wireless communication device, a communication signal during the TXOP based on a second search space.

In some embodiments, the computer-readable medium further comprises code for causing the first wireless communication device to monitor a control channel in a time period outside of the TXOP based on the first search space; code for causing the first wireless communication device to detect a beginning of the TXOP; and code for causing the first wireless communication device to monitor the control channel based on the second search space during the TXOP based on the detecting. In some embodiments, the computer-readable medium further comprises code for causing the first wireless communication device to monitor a control channel in a time period outside of the TXOP and at least a beginning portion of the TXOP based on the first search space; code for causing the first wireless communication device to determine that the TXOP has started based on the monitoring of a portion of the first search space overlapping with the second search space; and code for causing the first wireless communication device to monitor the control channel based on the second search space in a portion of the TXOP after the determining. In some embodiments, the computer-readable medium further comprises code for causing the first wireless communication device to transmit, a scheduling grant for the second wireless communication device in the second search space during the TXOP, wherein the communication signal is communicated based on the scheduling grant.

Further embodiments of the present disclosure include an apparatus comprising means for communicating, with a second wireless communication device, a first configuration including a set of first control channel monitoring periods outside of a transmission opportunity (TXOP); and means for communicating, with the second wireless communication device, a communication signal during the TXOP based on a second control channel monitoring period longer than each of the first control channel monitoring periods.

In some embodiments, wherein the set of first control channel monitoring periods are contiguous in time and adjacent to another set of first control channel monitoring periods contiguous in time, and wherein the another set of first control channel monitoring periods are assigned to a third wireless communication device different from the apparatus and the second wireless communication device. In some embodiments, wherein the set of first control channel monitoring periods interleaves with another set of first control channel monitoring periods in time, and wherein the another set of first control channel monitoring periods are assigned to a third wireless communication device different from the apparatus and the second wireless communication device. In some embodiments, the apparatus further comprises means for communicating, with the second wireless communication device, a second configuration including a third control channel monitoring period outside of the TXOP, wherein the third control channel monitoring period is longer than each of the first control channel monitoring periods. In some embodiments, wherein the means for communicating the second configuration is further configured to communicate, with the second wireless communication device, at least one of a control channel message including the second configuration or a scheduling grant including the second configuration. In some embodiments, the apparatus further comprises means for monitoring a control channel for a scheduling grant from the second wireless communication device based on the set of first control channel monitoring periods; means for determining that no scheduling grant has been received from the second wireless communication device for a time period; and means for switching, in response to the determining, to monitor the control channel based on a third control channel monitoring period that is longer than each of the first control channel periods. In some embodiments, the apparatus further comprises means for communicating, with the second wireless communication device during a third control channel monitoring period of the set of first control channel monitoring periods, a scheduling grant for a first transmission time interval (TTI), the third control channel monitoring period located within another TXOP and associated with scheduling of a second TTI shorter than the first TTI; and means for communicating, with the second wireless communication device, a communication signal during the first TTI based on the scheduling grant. In some embodiments, the apparatus further comprises means for communicating, with the second wireless communication device, an instruction to enable or disable control channel monitoring. In some embodiments, wherein the TXOP is in a first frequency band, and wherein the instruction is communicated in a second frequency band different from the first frequency band. In some embodiments, wherein the means for communicating the instruction is further configured to communicate, with the second wireless communication device, the instruction to disable the control channel monitoring for a time period between the TXOP and a next TXOP, and wherein the time period is associated with a listen-before-talk (LBT) backoff period for the next TXOP. In some embodiments, wherein the means for communicating the instruction is further configured to communicate, with the second wireless communication device, the instruction to enable the control channel monitoring, the instruction being based on an expected beam direction associated with the TXOP, the apparatus, and the second wireless communication device, and wherein the communication signal is communicated based on the expected beam direction. In some embodiments, wherein the means for communicating the instruction is further configured to transmit, to the second wireless communication device, the instruction to disable the control channel monitoring, the instruction being based on an expected beam direction associated with an expected communication between the apparatus and a third wireless communication device in another TXOP, and wherein the second wireless communication device is different from the third wireless communication device. In some embodiments, wherein the means for communicating the instruction is further configured to receive, from the second wireless communication device, the instruction to disable the control channel monitoring, the instruction being based on an expected beam direction associated with an expected communication between the second wireless communication device and a third wireless communication device in another TXOP, and wherein first wireless communication device is different from the third wireless communication device. In some embodiments, wherein the first configuration further includes a first subcarrier spacing for control channel monitoring in the set of first control channel monitoring periods outside of the TXOP, and wherein the apparatus further comprises means for communicating, with the second wireless communication device, a scheduling grant within the TXOP for communicating the communication signal based on a second subcarrier spacing that is smaller than the first subcarrier spacing.

Further embodiments of the present disclosure include an apparatus comprising means for communicating, with a second wireless communication device, a configuration including a first search space for a control channel monitoring outside of a transmission opportunity (TXOP) and a second search space for a control channel monitoring within the TXOP, the second search space being partially-overlapped with the first search space; and means for communicating, with the second wireless communication device, a communication signal during the TXOP based on a second search space.

In some embodiments, the apparatus further comprises means for monitoring a control channel in a time period outside of the TXOP based on the first search space; means for detecting a beginning of the TXOP; and means for monitoring the control channel based on the second search space during the TXOP based on the detecting. In some embodiments, the apparatus further comprises means for monitoring a control channel in a time period outside of the TXOP and at least a beginning portion of the TXOP based on the first search space; means for determining that the TXOP has started based on the monitoring of a portion of the first search space overlapping with the second search space; and means for monitoring the control channel based on the second search space in a portion of the TXOP after the determining. In some embodiments, the apparatus further comprises means for transmitting, a scheduling grant for the second wireless communication device in the second search space during the TXOP, wherein the communication signal is communicated based on the scheduling grant.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed in an unlicensed frequency band at a user equipment (UE), the method comprising:
    receiving a configuration indicating a first set of one or more downlink (DL) control channel monitoring periods and a second set of one or more DL control channel monitoring periods, wherein the first set of one or more DL control channel monitoring periods and the second set of one or more DL control channel monitoring periods are configured for monitoring DL control information (DCI), wherein the first set of one or more DL control channel monitoring periods is associated with a first DL control channel monitoring parameter, and wherein the second set of one or more DL control channel monitoring periods is associated with a second DL control channel monitoring parameter different from the first DL control channel monitoring parameter, wherein a duration of a DL control channel monitoring period of the first set of one or more DL control channel monitoring periods is different from a duration of a DL control channel monitoring period of the second set of one or more DL control channel monitoring periods;
    receiving, based on the first DL control channel monitoring parameter, a first DCI in a first DL control channel monitoring period of the first set of one or more DL control channel monitoring periods; and
    receiving, based on a trigger to switch to the second set of one or more DL control channel monitoring periods and the second DL control channel monitoring parameter, a second DCI in a second DL control channel monitoring period of the second set of one or more DL control channel monitoring periods,
    wherein the first set of one or more DL control channel monitoring periods are outside of, and prior to, a transmission opportunity (TXOP), and wherein the second set of one or more DL control channel monitoring periods are within the TXOP, and
    wherein the first set of one or more DL control channel monitoring periods is a subset among two or more subsets of DL control channel monitoring periods outside the TXOP.

2. The method of claim 1, wherein the first set of one or more DL control channel monitoring periods partially overlaps with the second set of one or more DL control channel monitoring periods.

3. The method of claim 1, wherein the first set of one or more DL control channel monitoring periods is associated with a first priority, and wherein the second set of one or more DL control channel monitoring periods is associated with a second priority different from the first priority.

4. The method of claim 1, wherein the first DL control channel monitoring parameter indicates a first time interval that is less than a slot duration, and wherein the second DL control channel monitoring parameter indicates a second time interval that is greater than or equal to one slot duration.

5. The method of claim 1, further comprising:
    receiving a scheduling grant including the trigger indicating the switch to the second set of one or more DL control channel monitoring periods.

6. The method of claim 1, wherein the first DCI includes the trigger indicating the switch to the second set of one or more DL control channel monitoring periods.

7. The method of claim 1, wherein the first DL control channel monitoring period is within a first slot, wherein the TXOP begins within a second slot subsequent to the first slot, and wherein the first slot and the second slot are periodic scheduling intervals each comprising a plurality of symbols, and each comprising a same duration.

8. A method of wireless communication performed in at unlicensed frequency band at a network entity, the method comprising:
    transmitting, to a user equipment (UE), a configuration indicating a first set of one or more downlink (DL)

control channel monitoring periods and a second set of one or more DL control channel monitoring periods, wherein the first set of one or more DL control channel monitoring periods and the second set of one or more DL control channel monitoring periods are configured for monitoring DL control information (DCI), wherein the first set of one or more DL control channel monitoring periods is associated with a first DL control channel monitoring parameter, and wherein the second set of one or more DL control channel monitoring periods is associated with a second DL control channel monitoring parameter different from the first DL control channel monitoring parameter, wherein a duration of a DL control channel monitoring period of the first set of one or more DL control channel monitoring periods is different from a duration of a DL control channel monitoring period of the second set of one or more DL control channel monitoring periods;

transmitting, to the UE based on the first DL control channel monitoring parameter, a first DCI in a first DL control channel monitoring period of the first set of one or more DL control channel monitoring periods; and transmitting, to the UE based on the second DL control channel monitoring parameter, a second DCI in a second DL control channel monitoring period of the second set of one or more DL control channel monitoring periods, wherein the first set of one or more DL control channel monitoring periods are outside of, and prior to, a transmission opportunity (TXOP), and wherein the second set of one or more DL control channel monitoring periods are within the TXOP, and wherein the first set of one or more DL control channel monitoring periods is a subset among two or more subsets of DL control channel monitoring periods outside the TXOP.

9. The method of claim 8, wherein the first set of one or more DL control channel monitoring periods partially overlaps with the second set of one or more DL control channel monitoring periods.

10. The method of claim 8, wherein the first set of one or more DL control channel monitoring periods is associated with a first priority, and wherein the second set of one or more DL control channel monitoring periods is associated with a second priority different from the first priority.

11. The method of claim 8, wherein the first DL control channel monitoring parameter indicates a first time interval that is less than a slot duration, and wherein the second DL control channel monitoring parameter indicates a second time interval that is greater than or equal to one slot duration.

12. The method of claim 8, further comprising: transmitting, to the UE, a trigger indicating a switch to the second set of one or more DL control channel monitoring periods.

13. The method of claim 12, wherein the transmitting the first DCI comprises the transmitting the trigger indicating the switch to the second set of one or more DL control channel monitoring periods.

14. The method of claim 12, wherein the transmitting the trigger comprises transmitting a scheduling grant.

15. The method of claim 8, wherein the first DL control channel monitoring period is within a first slot, wherein the TXOP begins within a second slot subsequent to the first slot, and wherein the first slot and the second slot are periodic scheduling intervals each comprising a plurality of symbols, and each comprising a same duration.

16. A user equipment (UE), comprising:

one or more processors; and one or more memories and a transceiver in communication with the one or more processors, wherein the UE is configured to:

receive a configuration for an unlicensed frequency band indicating a first set of one or more downlink (DL) control channel monitoring periods and a second set of one or more DL control channel monitoring periods, wherein the first set of one or more DL control channel monitoring periods and the second set of one or more DL control channel monitoring periods are configured for monitoring DL control information (DCI), wherein the first set of one or more DL control channel monitoring periods is associated with a first DL control channel monitoring parameter, and wherein the second set of one or more DL control channel monitoring periods is associated with a second DL control channel monitoring parameter different from the first DL control channel monitoring parameter, wherein a duration of a DL control channel monitoring period of the first set of one or more DL control channel monitoring periods is different from a duration of a DL control channel monitoring period of the second set of one or more DL control channel monitoring periods;

receive, in the unlicensed frequency band based on the first DL control channel monitoring parameter, a first DCI in a first DL control channel monitoring period of the first set of one or more DL control channel monitoring periods; and receive, in the unlicensed frequency band based on a trigger to switch to the second set of one or more DL control channel monitoring periods and the second DL control channel monitoring parameter, a second DCI in a second DL control channel monitoring period of the second set of one or more DL control channel monitoring periods, wherein the first set of one or more DL control channel monitoring periods are outside of, and prior to, a transmission opportunity (TXOP), and wherein the second set of one or more DL control channel monitoring periods are within the TXOP, and wherein the first set of one or more DL control channel monitoring periods is a subset among two or more subsets of DL control channel monitoring periods outside the TXOP.

17. The UE of claim 16, wherein the first set of one or more DL control channel monitoring periods partially overlaps with the second set of one or more DL control channel monitoring periods.

18. The UE of claim 16, wherein the first set of one or more DL control channel monitoring periods is associated with a first priority, and wherein the second set of one or more DL control channel monitoring periods is associated with a second priority different from the first priority.

19. The UE of claim 16, wherein the first DL control channel monitoring parameter indicates a first time interval that is less than a slot duration, and wherein the second DL control channel monitoring parameter indicates a second time interval that is greater than or equal to one slot duration.

20. The UE of claim 16, wherein the UE is further configured to:

receive a scheduling grant including the trigger indicating the switch to the second set of one or more DL control channel monitoring periods.

21. The UE of claim 16, wherein the first DCI includes the trigger indicating the switch to the second set of one or more DL control channel monitoring periods.

22. The UE of claim 16, wherein the first DL control channel monitoring period is within a first slot, wherein the TXOP begins within a second slot subsequent to the first slot, and wherein the first slot and the second slot are periodic scheduling intervals each comprising a plurality of symbols, and each comprising a same duration.

23. A network entity, comprising:

one or more processors; and one or more memories and a transceiver in communication with the one or more processors, wherein the network entity is configured to:

transmit, to a user equipment (UE), a configuration for an unlicensed frequency band indicating a first set of one or more downlink (DL) control channel monitoring periods and a second set of one or more DL control channel monitoring periods, wherein the first set of one or more DL control channel monitoring periods and the second set of one or more DL control channel monitoring periods are configured for monitoring DL control information (DCI), wherein the first set of one or more DL control channel monitoring periods is associated with a first DL control channel monitoring parameter, and wherein the second set of one or more DL control channel monitoring periods is associated with a second DL control channel monitoring parameter different from the first DL control channel monitoring parameter, wherein a duration of a DL control channel monitoring period of the first set of one or more DL control channel monitoring periods is different from a duration of a DL control channel monitoring period of the second set of one or more DL control channel monitoring periods;

transmit, in the unlicensed frequency band to the UE based on the first DL control channel monitoring parameter, a first DCI in a first DL control channel monitoring period of the first set of one or more DL control channel monitoring periods; and transmit, in the unlicensed frequency band to the UE based on the second DL control channel monitoring parameter, a second DCI in a second DL control channel monitoring period of the second set of one or more DL control channel monitoring periods, wherein the first set of one or more DL control channel monitoring periods are outside of, and prior to, a transmission opportunity (TXOP), and wherein the second set of one or more DL control channel monitoring periods are within the TXOP, and wherein the first set of one or more DL control channel monitoring periods is a subset among two or more subsets of DL control channel monitoring periods outside the TXOP.

24. The network entity of claim 23, wherein the first set of one or more DL control channel monitoring periods is associated with a first priority, and wherein the second set of one or more DL control channel monitoring periods is associated with a second priority different from the first priority.

25. The network entity of claim 23, wherein the first DL control channel monitoring parameter indicates a first time interval that is less than a slot duration, and wherein the second DL control channel monitoring parameter indicates a second time interval that is greater than or equal to one slot duration.

26. The network entity of claim 23, wherein the first DL control channel monitoring period is within a first slot, wherein the TXOP begins within a second slot subsequent to the first slot, and where in the first slot and the second slot are periodic scheduling intervals each comprising a plurality of symbols and each comprising a same duration.

* * * * *